(12) United States Patent
Takeyama

(10) Patent No.: US 6,822,770 B1
(45) Date of Patent: *Nov. 23, 2004

(54) OBSERVATION OPTICAL SYSTEM AND PHOTOGRAPHING OPTICAL SYSTEM AND APPARATUS USING THE SAME

(75) Inventor: Tetsuhide Takeyama, Tokyo (JP)

(73) Assignee: Olympus Corporation, Tokyo (JP)

( * ) Notice: Subject to any disclaimer, the term of this patent is extended or adjusted under 35 U.S.C. 154(b) by 852 days.

This patent is subject to a terminal disclaimer.

(21) Appl. No.: 09/698,127

(22) Filed: Oct. 30, 2000

(30) Foreign Application Priority Data

Oct. 13, 2000 (JP) .......................................... 2000-318253

(51) Int. Cl.7 ................................................. G03H 1/00
(52) U.S. Cl. ............................. 359/13; 359/14; 359/15; 359/630; 345/8
(58) Field of Search ...................... 359/13–15, 630–633; 345/7–9

(56) References Cited

U.S. PATENT DOCUMENTS

| | | | |
|---|---|---|---|
| 4,874,214 A | 10/1989 | Cheysson et al. | |
| 5,093,567 A | 3/1992 | Staveley | |
| 5,539,578 A | 7/1996 | Togino et al. | |
| 5,708,529 A | 1/1998 | Togino et al. | |
| 6,352,346 B1 * | 3/2002 | Kasai | 353/98 |
| 6,429,954 B1 * | 8/2002 | Kasai | 359/13 |
| 6,594,085 B2 * | 7/2003 | Ohtaka et al. | 359/631 |
| 6,687,029 B2 * | 2/2004 | Amanai et al. | 359/13 |

FOREIGN PATENT DOCUMENTS

| | | |
|---|---|---|
| JP | 9-171151 | 6/1997 |
| JP | 2000-180787 | 6/2000 |
| JP | 2000-241751 | 9/2000 |

OTHER PUBLICATIONS

Mukawa et al.; "Novel Virtual Image Optics for Reflective Microdisplays", Conference Record of the 20th International Display Research Conference, Sep. 25–28, 2000, Society for Information Display, pp. 96–99.

* cited by examiner

Primary Examiner—Fayez Assaf
(74) Attorney, Agent, or Firm—Pillsbury Winthrop LLP

(57) ABSTRACT

An eyepiece optical member introduces into an exit pupil an observation image formed by an observation image forming member. The eyepiece optical member is configured so that a first prism that has a first entrance surface, a reflecting surface and a first exit surface arranged with a first prism medium between and a second prism that has a second entrance surface and a second exit surface arranged with a second prism medium between are joined to each other via a hologram element interposed between the first exit surface and the second entrance surface. The reflecting surface is shaped as a concave surface to give a positive power for rays reflected therefrom. The first entrance surface and the second exit surface are shaped as curved surfaces, respectively, to give a power for rays transmitted therethrough.

31 Claims, 16 Drawing Sheets

———————— 650.0 NM
- - - - - - - - - - 630.0 NM
— - — - — - — 610.0 NM

LATERAL ABERRATIONS IN R BAND

——————— 540.0 NM
- - - - - - - - 520.0 NM
— - — - — - — 500.0 NM

LATERAL ABERRATIONS IN G BAND

——————— 490.0 NM
- - - - - - - - - - 470.0 NM
— - — - — - — 450.0 NM

LATERAL ABERRATIONS IN B BAND (EXAMPLE) WHERE MEDIUM IS AIR WITH n=1:
$$\Phi_0{}^{2P} = -r_2 - r_1 < 0$$

OBSERVATION OPTICAL SYSTEM AND PHOTOGRAPHING OPTICAL SYSTEM AND APPARATUS USING THE SAME

BACKGROUND OF THE INVENTION

1) Field of the Invention

The present invention relates to an observation optical system and a photographing optical system and an apparatus using the same.

2) Description of Related Art

In recent years, development has been energetically made for image display apparatuses, specifically for those to be held on the head or face of individuals for entertaining them with a large image. Also, in accordance with recent popularization of portable telephone and portable intelligent terminal, requirements for large view of graphics or text data on these apparatuses have grown.

As an optical system applicable to such apparatuses, each of FIG. 7(a) of Japanese Patent Application Preliminary Publication (KOKAI) No. 7-140414 and Japanese Patent Application Preliminary Publication (KOKAI) No. 9-171151 proposes an optical system in which a half mirror as a tilted mirror for splitting a path is disposed in a prism optical system that includes a concave mirror with a small amount of decentering.

Also, FIG. 9 of U.S. Pat. No. 5,093,567 proposes an optical system in which a first prism including a triangular prism is disposed on the eye side and in which a second prism is disposed at a minute air space away therefrom. Also, each of FIG. 3 of Japanese Patent Application Preliminary Publication (KOKAI) No. 2000-241751 and FIG. 3 of Japanese Patent Application Preliminary Publication (KOKAI) No. 2000-180787 proposes an optical system in which a first prism having a convex lens action is disposed on the eye side and in which a second prism is disposed at a minute air space away therefrom. These optical systems bend the path of light without loss of amount of light by utilizing total reflection phenomenon caused by difference in refractive index between glass and air at the minute air space between the prisms.

Also, U.S. Pat. No. 4,874,214 proposes an observation optical system having hologram elements. This observation optical system uses the hologram elements at the plane surface (2) and the spherical surface (3).

However, in the optical system as disclosed in FIG. 7(a) of KOKAI No.7-140414 or in KOKAI No. 9-171151, since the tilted mirror disposed in the prism optical system for splitting the path is constructed of a half mirror, amount of light from the image display element is attenuated to ¼ via twice transmission through the half mirror, to cause dark view of the displayed image. In order to obviate this result, it is necessary to use a bright illumination source, which consumes more power, for illumination of the image display element. If conditions regarding available power consumption, performance of the light source device etc. do not allow a light source to be made bright, observation of the displayed image under bright sunlight could not be made.

Also, in the observation optical system as disclosed in FIG. 9 of U.S. Pat. No. 5,093,567, in FIG. 3 of KOKAI No. 2000-2141751 or in FIG. 3 of KOKAI No. 2000-7180787, since a minute air space is provided between two prisms, alignment of optical axes of these two prisms with each other is required in setting these prisms in place while keeping the air space between, to raise the cost for assembling. Also, impact or vibration applied to an apparatus including such an observation optical system is likely to disorder the alignment of the optical axes.

The optical system proposed in U.S. Pat. No. 4,874,214 is provided with a hologram element that is disposed on the spherical surface 3 and that has the shape of a curved surface.

A hologram element having a shape of a curved surface has two kinds of powers, i. e. an optical power resulting from the shape and a power resulting from the diffraction effect of the hologram element. In reference to the drawings, these two kinds of powers of a hologram element formed on a base member having a spherical surface shape, for example, are explained. The hologram element has a power resulting from difference in interference fringe density such as the pitch of the grating structure in the hologram element as shown in FIG. 17A, and has an optical power resulting from its curved surface shape as shown in FIG. 17B. The optical power of the hologram element depending on its shape is influenced by thickness of the base member also. The power depending on the shape increases as the thickness of the base member increases.

However, in the observation optical system set forth in U.S. Pat. No. 4,874,214, since the space between the plane surface (2) and the spherical surface (3) is not filled with a medium such as glass or plastic, the optical power resulting from the curved surface shape of the hologram element is small and thus it is difficult to compensate spherical aberration and coma. Furthermore, in this observation optical system, since no optical element is disposed adjacent to the image display element, or in the path between the image surface and the plane surface (2), where compensation of distortion could be effectively made, it is difficult to compensate distortion in good condition.

SUMMARY OF THE INVENTION

The present invention has been made to solve the above-mentioned problems involved in the conventional art. An object of the present invention is to provide an observation optical system that allows a displayed image to be bright as observed, is easily assembled, is insusceptible to vibration or impact, is lightweight and compact, and allows, in addition, the displayed image to be observed upon aberrations being compensated in good condition, and to provide an apparatus using the same. Also, upon the travelling direction of light in the path being inverted, such an optical system is applicable to a photographing optical system provided with an imaging optical system which forms an object image, and is applicable to an apparatus using the same.

The observation optical system according to the present invention comprises an observation image forming member which forms an image to be viewed by an observer, and an eyepiece optical member which introduces into an exit pupil formed at the position of the eye of the observer the observation image formed by the observation image forming member. In the observation optical system, the eyepiece optical member includes, at least, a first prism member and a second prism member. The first prism at least includes a first entrance surface through which rays emergent from the observation image enter the first prism, a reflecting surface which reflects the rays inside the first prism, and the first exit surface through which the rays exit out of the first prism. These surfaces are arranged with a first prism medium between. The second prism at least includes a second entrance surface through which the rays emergent from the first prism enter the second prism and a second exit surface through which the rays exit out of the second prism. These surfaces are arranged with a second prism medium between.

Since, in this way, the space inside the eyepiece optical member is filled with glass or plastic material, the optical power depending on the surface shape of each optically operative surface is made large, to compensate aberrations such as spherical aberration and coma in good condition.

Also, the observation optical system according to the present invention is constructed so that, in addition to the above-mentioned configuration, the first prism and the second prism are joined to each other via a hologram element interposed between the first exit surface and the second entrance surface.

The hologram element used as a tilted mirror to split the path achieves diffraction efficiency of nearly 100% in performing reflection by diffraction, and thus can provide bright view of the displayed image without loss of amount of light. Also, since the image display element-side prism and the eye-side prism are joined via a hologram element interposed between, to be an integral member, the assembly process can be free from possible inconsistency of optical axes and complicated works for prism setting, which otherwise would be induced by the air space. As a result, an observation optical system that is easily assembled and is insusceptible to vibration or impact can be achieved.

Also, since the hologram element is applied to the first prism and the second prism as interposed between, it is already shielded from dust. Therefore, without an additional dust shield member, this structure can prevent dust from being visible as an enlarged image and prevent the hologram element from swelling by absorption of water from outside and thus from changing its characteristic regarding the peak wavelength for diffraction.

Furthermore, the observation optical system according to the present invention is constructed so that, in addition to the above-mentioned configuration, the reflecting surface of the first prism is shaped as a concave curved surface to give a positive power for rays reflected therefrom, that the first entrance surface of the first prism is shaped as a curved surface to give a power for rays transmitted therethrough, and that the second exit surface of the second prism is shaped as a curved surface to give a power for rays transmitted therethrough.

Also, in the observation optical system according to the present invention, it is preferred that the first prism medium and the second prism medium are made of the same material.

Also, in the observation optical system according to the present invention, it is preferred that the first exit surface of the first prism and the second entrance surface of the second prism are substantially congruently shaped. Here, "substantially congruently shaped" is intended to mean that difference in shape between the surfaces in the range of manufacture error is allowable.

Also, in the observation optical system according to the present invention, it is preferred that each of the first exit surface of the first prism and the second entrance surface of the second prism is shaped as a curved surface.

Whereby, distortion is compensated using the power of the hologram element determined by the surface shape of the first exit surface and the second entrance surface, and the rotationally symmetric component and the rotationally asymmetric component of chromatic aberration of magnification are compensated using the power of the hologram element generated by reflecting diffraction.

Also, in the observation optical system according to the present invention, it is preferred that each of the first exit surface of the first prism and the second entrance surface of the second prism is shaped as a rotationally symmetric spherical surface.

If the hologram element surface is designed to be spherical and is produced via application of liquid-state photopolymer etc, as a hologram element medium, onto a prism surface by spraying, application with uniform thickness can be easily achieved upon the spraying position being adjusted to coincide with the center of the curvature of the spherical surface.

The reason is given as follows. In the case of a rotationally asymmetric surface or a rotationally symmetric aspherical surface, the distance from a spraying position to the prism surface varies point by point on the surface and thus the sprayed photopolymer cannot have uniform density as applied. Whereas, in the case of a spherical surface, the spraying position of the photopolymer can be adjusted, as discussed above, to be equidistant from the prism surface.

It is noted that if the hologram element directs its concave surface to the exit pupil side, it is desirable that the photopolymer is applied to the first exit surface of the first prism, while, if the hologram element directs its convex surface toward the exit pupil side, it is desirable that the photopolymer is applied to the second entrance surface of the second prism.

Also, in the observation optical system according to the present invention, it is preferred that a ghost light removing member is provided for optically non-operative faces of the first prism and the second prism so as to prevent ghost light from being introduced to the eye of the observer, the optically non-operative faces being defined as faces of the first prism and the second prism other than optically operative faces used to transmit or reflect rays.

Where the first entrance surface of the first prism is defined as a top surface, it is effective to provide the ghost light removing member on a bottom surface and side surfaces of the eyepiece optical member. Furthermore, a region outside the effective diameter for rays on the first entrance surface, a region outside the effective diameter for rays on the reflecting surface of the first prism, and a region outside the effective diameter for rays on the second exit surface of the second prism are included in the optically non-operative faces. Application of the ghost light removing member to these regions is effective.

Also, in the observation optical system according to the present invention, it is preferred that the first entrance surface of the first prism is shaped as a rotationally asymmetric curved surface.

In this configuration, since a transmitting surface (the first entrance surface of the first prism) is disposed in front of an image forming member such as an image display element, distortion can be compensated in good condition. Although the surface in front of the image forming member such as an image display element may be shaped as a rotationally symmetric surface, it is much desirable to use a free curved surface, if optically operative faces are arranged to be decentered for the purpose of reducing the size of the observation optical system, to compensate decentered aberrations caused by the decentered arrangement.

Also, in the observation optical system according to the present invention, it is preferred that the rotationally asymmetric curved surface of the first entrance surface of the first prism is constructed of a free curved surface that defines only one plane of symmetry, and that the only one plane of symmetry coincides with a plane (Y-Z plane) in which the optical axis is folded.

Also, in the observation optical system according to the present invention, it is preferred that the hologram element is constructed and arranged to compensate both of the rotationally symmetric component and the rotationally asymmetric component of chromatic aberration of magnification by reflecting diffraction.

Use of a reflection-type hologram element for compensation of the rotationally symmetric component and the rotationally asymmetric component of the chromatic aberration of magnification can achieve high contrast.

Also, in the observation optical system according to the present invention, it is important that the following condition (1) is satisfied:

$$50°<\theta<80° \quad (1)$$

where $\theta$ is an angle formed between a tangent to the hologram element surface at an intersection with an axial chief ray and a visual axis, the axial chief ray being defined as a ray travelling between the center of the pupil surface and the center of the image surface (see FIG. 18).

A tilt angle of the hologram element surface deviating from 45° allows the entire thickness of the observation optical system to be reduced, to achieve a compact and lightweight apparatus.

The deviation of the tilt angle of the hologram element surface from 45° generates decentered aberrations. According to the present invention, free curved surfaces are arranged on a surface from which light from the observation image forming member enters the prism (i. e. the first entrance surface of the first prism), a surface which reflects diffracted light from the hologram element (i. e. the reflecting surface of the first prism), and a surface in front of the eye (i. e. the second exit surface of the second prism), respectively, so as to compensate these decentered aberrations. In addition, the base surface of the hologram element is spherically shaped so as to compensate coma and curvature of field in good condition.

The tilt angle of the hologram element surface in reference to the visual axis is expressed by $\theta$. If the hologram element surface is shaped as a curved surface as in the present invention, $\theta$ is defined between the tangent to the hologram element surface at the intersection with the axial chief ray and the visual axis, as shown in FIG. 18. In this case, it is important that Condition (1) is satisfied.

If a value of $\theta$ is below the lower limit of Condition (1), the tilt angle of the tilted mirror becomes so small that the eyepiece optical member becomes thick and accordingly the observation optical system becomes large and heavy. On the other hand, if a value of $\theta$ exceeds the upper limit of Condition (1), the amount of decentering of the eyepiece optical member becomes so large that compensation of decentered aberrations becomes difficult and accordingly observation of a high-contrast image with well-compensated distortion becomes difficult.

It is much desirable that the following condition (2) is satisfied:

$$60°<\theta<70° \quad (2)$$

The upper and lower limits of Condition (2) are based on the same consideration as in Condition (1).

Also, in the observation optical system according to the present invention, it is preferred that the second exit surface of the second prism is shaped as a rotationally asymmetric curved surface that has an action of compensating at least one of those rotationally asymmetric aberrations including a rotationally asymmetric coma and a rotationally asymmetric astigmatism, which are generated at the eyepiece optical member.

Also, in the observation optical system according to the present invention, it is preferred that the rotationally asymmetric curved surface of the second exit surface of the second prism is constructed of a free curved surface defining only one plane of symmetry and that the plane of symmetry coincides with a plane (Y-Z plane) in which an optical axis is folded.

Also, according to the present invention, it is desirable that surfaces included in the first prism and the second prism are shaped as rotationally asymmetric surfaces such as free curved surfaces so as to achieve an optical system with good quality regarding compensation of rotationally asymmetric distortion and telecentricity. However, these surfaces may be shaped as rotationally symmetric surfaces such as spherical surfaces, aspherical surfaces, and anamorphic surfaces.

In the observation optical system according to the present invention, bundles of rays from the observation image formed by the observation image forming member enter the first prism as transmitted through the first entrance surface. The bundles of rays entering the first prism is incident on the volume hologram at a first incident angle, which is within the range of angular selectivity, to be reflected therefrom by diffraction, and is then reflected at the reflecting surface. The reflected bundles of rays are again incident on the volume hologram surface at a second incident angle. This time, since the second incident angle is out of the range of the angular selectivity, diffraction efficiency is extremely low and thus the bundles of rays substantially pass through the first exit surface, to enter the second prism as transmitted through the second entrance surface.

The bundles of rays entering the second prism exit therefrom as passing through the second exit surface, to be introduced to the eye of the observer.

As discussed above, according to the present invention, it is not necessary to provide a half mirror for splitting the path or to provide an air space. Therefore, an observation optical system that allows a displayed image to be bright as observed with small loss of amount of light, is easily assembled, is insusceptible to vibration or impact, is lightweight and compact, and allows, in addition, a displayed image to be observed upon aberrations being compensated in good condition, and an apparatus using the same can be achieved.

Also, the observation optical system according to the present invention may further include an optical member, such as a prism, a plane parallel glass plate and a positive or negative lens, disposed between the first entrance surface of the first prism and the observation image forming member.

Also, the observation optical system according to the present invention may further include an optical member, such as a prism, a plane parallel glass plate and a positive or negative lens, disposed between the second exit surface of the second prism and the exit pupil.

It is noted that these features of the optical system according to the present invention are applicable not only to the observation system but also to a photographing system.

A photographing optical system according to the present invention comprises an image pickup element disposed on an image surface for photographing an image of an object, an aperture stop disposed on a pupil surface for regulating brightness of a beam of rays emergent from the object, and an imaging optical member disposed between the image surface and the pupil surface for introducing the image of the object to the image surface. The imaging optical member includes, at least, a second prism member and a first prism member. The second prism at least includes a third entrance surface through which rays emergent from the object and passing through the aperture stop enter the second prism and a third exit surface through which the rays exit out of the second prism. These surfaces are arranged with a second prism medium between. The first prism at least includes a fourth entrance surface through which the rays emergent from the second prism enter the first prism, a reflecting surface which reflects the rays inside the first prism, and a fourth exit surface through which the rays exit out of the first prism. These surfaces are arranged with a first prism medium between. The second prism and the first prism are configured to be joined to one another via a hologram element interposed between the third exit surface and the fourth entrance surface. Furthermore, the reflecting surface of the first prism is shaped as a concave curved surface to give a positive power for rays reflected therefrom, the fourth exit surface of the first prism is shaped as a curved surface to give a power for rays transmitted therethrough, and the third entrance surface of the second prism is shaped as a curved surface to give a power for rays transmitted therethrough.

In other words, if the observation image forming member, the exit pupil and the eyepiece optical member of the observation optical system according to the present invention are replaced by the image pickup element, the aperture stop and the imaging optical system, respectively, the photographing optical system according to the present invention is configured.

It is preferred that the photographing optical system also has features similar to the observation optical system, such as the above-described numerical conditions.

Also, the observation optical system according to the present invention may be configured so that a mirror coating is applied to the reflecting surface of the first prism.

Also, the reflecting surface of the first prism may be configured as a total reflection surface, which reflects bundles of rays that are incident thereon at angles greater than the critical angle and which transmits bundles of rays that are incident thereon at angles not greater than the critical angle. In addition, an optical member that transmits light may be provided on the reflecting surface side of the first prism.

This configuration allows an observer to perform see-through observation. The observer can carry on wearing a head- or face-mount type image display apparatus using the observation optical system of the present invention without sacrificing normal observation of view outside. In short, the observer is not bothered to take off and on the apparatus during use.

This configuration is applicable to image superposition mode where an image from the image display element and an image from outside can be simultaneously viewed as overlapped images.

It is noted that the reflecting surface of the first prism may be constructed of a half mirror, to realize see-through observation.

Also, an image display element, a main frame in which any one of the above-mentioned observation optical system of the present invention is arranged as an eyepiece optical system, a support member which supports the main frame on the head of the observer so as to hold the exit pupil of the observation optical system at the position of the eye of the observer, and a speaker member which provides a sound for an ear of the observer can be combined into a head-mount type image display apparatus.

Such a head-mount type image display apparatus may be configured so that the main frame is provided with an observation optical system for a right eye and an observation optical system for a left eye, and that the speaker member has a speaker member for a right ear and a speaker member for a left ear.

Also, in the head-mount type image display apparatus, the speaker member may be constructed of an earphone.

In the optical system of the present invention, unless at least one of reflecting surfaces is decentered from an axial chief ray, the path of the axial chief ray incident on reflecting surfaces coincides with the path of the axial chief ray reflected therefrom and thus the axial chief ray is interrupted in the optical system, where the axial chief ray is defined as a ray travelling from the center of the object point, via the center of the pupil in the case of observation optical system or of the aperture stop in the case of the photographing optical system, through the center of the image surface, as traced in the reverse direction in the case of the observation optical system or in the forward direction in the case of the photographing optical system. As a result, a beam of rays with its central portion being interrupted is used for image formation and thus the image becomes dark at its center or the image formation is completely failed at the center. Therefore, prisms applied to the present invention are decentered prisms.

Also, in the case where a reflecting surface having a power is decentered from the axial chief ray, it is desirable that at least one of surfaces included in the prism members used in the present invention is shaped as a rotationally asymmetric surface. It is particularly preferred that at least one reflecting surface of the prism members is shaped as a rotationally asymmetric surface in view of compensation of aberrations.

In order to fold a path of rays upon repeatedly using a common region for the path, an optical system should have decentered arrangement. However, if the optical system is configured as a decentered optical system for folding the path, decentered aberrations such as a rotationally asymmetric distortion and a rotationally asymmetric curvature of field are generated. In order to compensate such decentered aberrations, rotationally asymmetric surfaces are used as mentioned above.

By the similar reason, it is desirable that the power surface of the hologram element used in the present invention also is a rotationally asymmetric surface.

The first exit surface of the first prism and the second entrance surface of the second prism, which are joined to each other via the hologram element between, may be shaped as, other than the curved or rotationally symmetric spherical surface as described above, any one of an aspherical surface, an anamorphic surface, a toric surface, a surface that defines only one plane of symmetry, and a plane-symmetric free curved surface.

Also, a rotationally asymmetric surface used in the present invention may be configured as any one of an anamorphic surface, a toric surface, and a free curved surface that defines only one plane of symmetry. Specifically, the surface is preferably configured as a free curved surface that defines only one plane of symmetry.

According to the present invention, the axial chief ray is defined, in the case of the observation optical system, as a ray travelling from the center of the exit pupil through the center of the observation image forming member as traced in the reverse direction, or, in the case of the photographing optical system, as a ray travelling from the center of the aperture stop through the center of the image pickup element as traced in the forward direction. The optical axis, which is defined by the straight line portion of the axial chief ray from the center of the exit pupil or of the aperture stop to the point of intersection with the second exit surface or with the third entrance surface of the second prism, is defined as Z axis. The axis that intersects Z axis at right angles and that lies in a plane of decentering for each surface constituting the second prism is defined as Y axis. The axis that intersects Z axis and Y axis at right angles is defined as X axis. The center of the exit pupil or of the aperture stop is determined as the origin of the coordinate system for the observation optical system or the photographing optical system of the present invention. Also, according to the present invention, surface arrangement numbers are assigned in order from the exit pupil through the observation image forming member to conform to the reverse ray tracing or in order from the aperture stop through the image pickup element to conform to the forward ray tracing. The direction of the axial chief ray from the exit pupil toward the observation image forming member or from the aperture stop toward the image pickup element is defined as a positive direction of Z axis. A direction of Y axis that is toward the observation image forming member or the image pickup element is defined as a positive direction of Y axis. A direction of X axis which forms a right hand system along with Y axis and Z axis is defined as a positive direction of X axis.

Here, the free curved surface used in the present invention is defined by the following equation (3) where Z axis appearing therein is the axis of the free curved surface:

$$Z = cr^2 / \{1 + \sqrt{1-(1+k)c^2r^2}\} + \sum_{j=2}^{66} c_j X^m Y^n \quad (3)$$

The first term of Equation (3) expresses the spherical component. The second term of Equation (3) expresses the free curve component. In the term of the spherical component, c represents a curvature at the vertex, k represents a conic constant, and $r=\sqrt{X^2+Y^2}$.

The term of the free curve component is expanded as shown in the following equation (4):

$$\sum_{j=2}^{66} C_j X^m Y^n = C_2 X + C_3 Y + C_4 X^2 + C_5 XY + C_6 Y^2 + C_7 X^3 +$$
$$C_8 X^2 Y + C_9 XY^2 + C_{10} Y^3 + C_{11} X^4 + C_{12} X^3 Y +$$
$$C_{13} X^2 Y^2 + C_{14} XY^3 + C_{15} Y^4 + C_{16} X^5 + C_{17} X^4 Y +$$
$$C_{18} X^3 Y^2 + C_{19} X^2 Y^3 + C_{20} XY^4 + C_{21} Y^5 + C_{22} X^6 +$$
$$C_{23} X^5 Y + C_{24} X^4 Y^2 + C_{25} X^3 Y^3 + C_{26} X^2 Y^4 +$$
$$C_{27} XY^5 + C_{28} Y^6 + C_{29} X^7 + C_{30} X^6 Y + C_{31} X^5 Y^2 +$$
$$C_{32} X^4 Y^3 + C_{33} X^3 Y^4 + C_{34} X^2 Y^5 + C_{35} XY^6 + C_{36} Y^7 \quad (4)$$

where $C_j$ (j is integer equal to or greater than 2) is a coefficient.

In general, a free curved surface as expressed above does not have a plane of symmetry along X-Z plane or along Y-Z plane. However, according to the present invention, upon all terms with odd-numbered powers of X being nullified, the free curved surface can define only one plane of symmetry that is parallel to Y-Z plane. Such a free curved surface is obtained, for example, by setting values of the coefficients $C_2$, $C_5$, $C_7$, $C_9$, $C_{12}$, $C_{14}$, $C_{16}$, $C_{18}$, $C_{20}$, $C_{23}$, $C_{25}$, $C_{27}$, $C_{29}$, $C_{31}$, $C_{33}$, $C_{35}$ ... of the terms in Equation (4) at zero.

Alternatively, upon all terms with odd-numbered powers of Y being nullified, the free curved surface can define only one plane of symmetry that is parallel to X-Z plane. Such a free curved surface is obtained, for example, by setting values of the coefficients $C_3$, $C_5$, $C_8$, $C_{10}$, $C_{12}$, $C_{14}$, $C_{17}$, $C_{19}$, $C_{21}$, $C_{23}$, $C_{25}$, $C_{27}$, $C_{30}$, $C_{32}$, $C_{34}$, $C_{36}$ ... of the terms in Equation (4) at zero.

Also, a free curved surface that defines one of the above-mentioned planes of symmetry is arranged so that its plane of symmetry corresponds to the decentering direction of the optical system. That is, a free curved surface defining a plane of symmetry parallel to Y-Z plane is combined with an optical system having decentering direction along Y axis, and a free curved surface defining a plane of symmetry parallel to X-Z plane is combined with an optical system having decentering direction along X axis, to effectively compensate rotationally asymmetric aberrations caused by decentering and to improve facility for fabrication.

Equation (3) is presented as one example that can define a free curved surface. The present invention is characteristic in compensating rotationally asymmetric aberrations resulting from decentering and improving facility for fabrication by using a rotationally asymmetric surface that defines only one plane of symmetry. Even if the free curved surface of the present invention is defined by any different expression other than Equation (3), it still has a similar effect, as a matter of course.

According to the present invention, a reflecting surface included in the prism member can be shaped as a plane-symmetric free curved surface defining only one plane of symmetry.

Configuration of an anamorphic surface is defined by the following equation (5). The normal to the optical surface at the origin of the surface shape is defined as the axis of the anamorphic surface.

$$Z=(C_x \cdot X^2 + C_y \cdot Y^2)/[1+\{1-(1+K_x)C_x^2 \cdot X^2-(1+K_y)C_y^2 \cdot Y^2\}^{1/2}]+\Sigma R_n\{(1-P_n)X^2+(1+P_n)Y^2\}^{(n+1)} \quad (5)$$

Here, if it is assumed that n is from 1 to 4 (polynomial of degree 4), for example, Equation (5) is expanded as the following expression (6):

$$Z=(C_x \cdot X^2 + C_y \cdot Y^2)/[1+\{1-(1+K_x)C_x^2 \cdot X^2-(1+K_y)C_y^2 \cdot Y^2\}^{1/2}]$$
$$+R_1\{(1-P_1)X^2+(1+P_1)Y^2\}^2$$
$$+R_2\{(1-P_2)X^2+(1+P_2)Y^2\}^3$$
$$+R_3\{(1-P_3)X^2+(1+P_3)Y^2\}^4$$
$$+R_4\{(1-P_4)X^2+(1+P_4)Y^2\}^5 \quad (6)$$

where Z is an amount of deviation from a plane tangent to the origin of the surface shape, $C_x$ is a curvature in X-axis direction, $C_y$ is a curvature in Y-axis direction, $K_x$ is a conical coefficient in X-axis direction, $K_y$ is a conical coefficient in Y-axis direction, $R_n$ is a rotationally symmetric component of a spherical surface term, and $P_n$ is a rotationally asymmetric component of an aspherical surface term. A radius of curvature $R_x$ in X-axis direction and a radius of curvature $R_y$ in Y-axis direction are correlated with the curvatures $C_x$ and $C_y$, respectively, as follows:

$$R_x=1/C_x, R_y=1/C_y.$$

Regarding the toric surface, there are two kinds; i. e. X toric surface and Y toric surface, which are expressed by the following equations (7), (8), respectively. The normal to the optical surface at the origin of the surface shape is defined as the axis of the toric surface.

X toric surface is defined as follows:

$$F(X) = C_x \cdot X^2 / [1 + \{1-(1+K)C_x^2 \cdot X^2\}^{1/2}] + AX^4 + BX^6 + CX^8 + DX^{10} \ldots$$
$$Z = F(X) + (1/2)C_y\{Y^2 + Z^2 - F(X)^2\} \quad (7)$$

Y toric surface is defined as follows;

$$F(Y) = C_y \cdot Y^2 / [1 + \{1-(1+K)C_y^2 \cdot Y^2\}^{1/2}] + AY^4 + BY^6 + CY^8 + DY^{10} \ldots$$
$$Z = F(Y) + (1/2)C_x\{X^2 + Z^2 - F(Y)^2\} \quad (8)$$

where Z is an amount of deviation from a plane tangent to the origin of the surface shape, $C_x$ is a curvature in X-axis direction, $C_y$ is a curvature in Y-axis direction, K is a conical coefficient, and A, B, C, and D are aspherical coefficients. A radius of curvature $R_x$ in X-axis direction and a radius of curvature $R_y$ in Y-axis direction are correlated with the curvatures $C_x$, and $C_y$, respectively, as follows:

$$R_x = 1/C_x, \quad R_y = 1/C_y.$$

Regarding the hologram element, there are two types; i.e. a relief hologram and a volume hologram. The relief hologram has the property of low selectivity regarding incident angle and low selectivity regarding wavelength. Thus, such a type of hologram diffracts rays with a particular wavelength incident thereon at a particular angle and images them as desired diffraction order rays, while diffracting, at a low diffraction efficiency, other rays with different wavelengths incident thereon at different angles and imaging them as undesired order rays. In contrast, the volume hologram has the property of high selectivity with respect to incident angle and high selectivity with respect to wavelength. Thus, such a type of hologram exclusively diffracts rays with a particular wavelength incident thereon at a particular angle, while transmitting the remaining rays as zero order rays so that undesired order rays should hardly be imaged.

Therefore, if a reflection-type volume hologram is used as the hologram element of the present invention, image blur because of undesired order rays is obviated, and thus a clear image can be provided for observation.

The volume hologram used as a hologram element (HOE) in the present invention is defined as follows. FIG. 19 is a view to show the principle of defining HOE according to the present invention.

Ray tracing for a ray with wavelength A incident on and emergent from any point P on the HOE surface is given by the following equation (9), which uses the optical path difference function (Do defined for a reference wavelength $\lambda_0$=HWL on the HOE surface:

$$n_d Q_d \cdot N = n_i Q_i \cdot N + m(\lambda/\lambda_0)\nabla\Phi_0 \cdot N \quad (9)$$

where N is a vector of the normal to the HOE surface, $n_i$ ($n_d$) is a refractive index on the incident side (emergent side), $Q_i$ ($Q_d$) is a vector of incidence (emergence), and m=HOR is a diffraction order of emergent light.

If the HOE is fabricated (defined) by two point light sources with the reference wavelength $\lambda_0$, specifically by interference between object rays emanating from the point $P_1$=(HY1, HY2, HY3) and reference rays emanating from the point $P_2$=(HX2, HY2, HZ2) as shown in FIG. 19, the following equation is satisfied:

$$\Phi_0 = \Phi_0^{2P} = n_2 \cdot s_2 \cdot r_2 - n_1 \cdot s_1 \cdot r_1$$

where r1 (r2) is a distance (>0) from the point P1 (P2) to a predetermined coordinate point (i.e. the origin) O on the HOE, $n_1$ ($n_2$) is a refractive index of the point $P_1$ ($P_2$)-side medium by which the HOE was arranged during fabrication (definition), $s_1$=HV1, and $s_2$=HV2 are signs to take into consideration the travelling direction of light. In the case where the light source is a divergent light source (real point light source), the sign is set to be REA=+1, while in the case where the light source is a convergent light source (virtual point light source), the sign is set to be VIR=−1. It is noted that in defining a HOE in lens data, the refractive index $n_1$ ($n_2$) of the medium in which the HOE was arranged during fabrication is the refractive index of the medium that is adjacent to the HOE on the side of the point $P_1$ ($P_2$).

In general cases, reference rays and object rays used to fabricate a HOE are not limited to spherical waves. In these cases, the optical path difference function $\Phi_0$ of HOE can be defined by the following equation (10) in which an additional phase term $\Phi_0^{Poly}$ (optical path difference function for the reference wavelength $\lambda_0$) expressed by polynomial terms is added:

$$\Phi_0 = \Phi_0^{2P} + \Phi_0^{Poly} \quad (10)$$

The polynomial $\Phi_0^{Poly}$ is given by:

$$\Phi_0^{Poly} = \sum_j H_j \cdot x^m \cdot y^n$$
$$= H_1 x + H_2 y + H_3 x^2 + H_4 xy + H_5 y^2 + H_6 x^3 +$$
$$H_7 x^2 y + H_8 xy^2 + H_9 y^3 + \ldots$$

and can be defined, in general, by:

$$j = \{(m+n)^2 + m + 3n\}/2$$

where $H_j$ is the coefficient of each term.

Furthermore, for convenience in optical designing, the optical path difference function $\Phi_0$ may be expressed only by the additional term as follows:

$$\Phi_0 = \Phi_0^{Poly}$$

whereby the HOE can be defined. For example, if the two point light sources $P_1$ and $P_2$ coincide, the component $\Phi_0^{2P}$ of the optical path difference function $\Phi_0$ derived from interference becomes zero. This condition corresponds to the case where the optical path difference function is expressed only by the additional terms (polynomial expression).

The above descriptions regarding HOE are made in reference to a local coordinate system determined by the HOE origin.

An example of the parameter set to define the HOE is shown below:

| Surface Arrangement No. | Radius of Curvature | Separation |
|---|---|---|
| object surface | ∞ | ∞ |
| stop | ∞ | 100 |
| 2 | 150 | −75 |

| HOE: | | |
|---|---|---|
| HV1 ($s_1$) = REA (+1) | | |
| HV2 ($s_2$) = VIR (−1) | | |
| HOR (m) = 1 | | |
| HX1 = 0, | HY1 = −3.40 × 10$^9$, | HZ1 = −3.40 × 10$^9$ |
| HX2 = 0, | HY2 = 2.50 × 10, | HZ2 = −7.04 × 10 |
| HWL ($\lambda_0$) = 544 | | |
| $H_1$ = −1.39 × 10$^{-21}$ | $H_2$ = −8.57 × 10$^{-5}$ | $H_3$ = −1.50 × 10$^{-4}$ |

Now, descriptions will be made of the principle of reflecting diffraction and transmission caused at the surface of the volume hologram used in the present invention. A result of a simulation, which was performed regarding the diffraction efficiency for P-polarized component based on the theory of Kogelnic, is presented. FIG. 18 shows the conditions under which the calculation of the diffraction efficiency was made. As light sources for R, G, B bands, LED light sources having center wavelengths of 630 nm, 520 nm, and 470 nm, respectively, are employed. Each of the LCDs is combined with a narrow-band filter so that its bandwidth is limited substantially within ±7 nm from the center wavelength. As an example, the inventor presents the calculation result of diffraction efficiency at the volume hologram surface for the axial chief ray of G band, which is obtained based on the assumption that the reference refractive index is 1.5 and the refracting diffraction angle is 0.05. The diffraction efficiency in the case where the incident angle of the axial chief ray is 45.1° and the reflecting diffraction angle of 45.2° is shown in FIGS. 20, 21. FIG. 20 is a graph in which the diffraction efficiency for the axial chief ray with the wavelength of 520 nm is plotted against the incident angle. FIG. 21 is a graph in which the diffraction efficiency for the axial chief ray forming the incident angle of 45.1° is plotted against the wavelength.

As shown in FIG. 20, for the axial chief ray with the wavelength of 520 nm, the diffraction efficiency of substantially 100% is obtained in the vicinity of the incident angle of ±45.1°. Also, as shown in FIG. 21, the reflecting diffraction efficiency is good within the wavelength range of 520 nm±7 nm. It is noted that the design is made so that the axial chief ray is again incident on the volume hologram surface at the incident mangle of 24.6° this time, after being reflected therefrom by diffraction and reflected from the reflecting surface of the first prism. As shown in FIG. 20, when the axial chief ray having the wavelength of 520 nm is incident on the volume hologram surface region with the above-described properties regarding the incident angle and the diffraction angle, at the incident angle of ±24.6°, which is out of the range of the angular selectivity of the volume hologram element within which high diffraction efficiency is assured, the diffraction efficiency becomes as low as 0%, and thus the axial chief ray passes through the hologram element.

Also, in the later-described embodiments, the incident angle and the reflecting diffraction angle of the axial chief ray on the volume hologram surface are 45.1° and 45.2°, respectively.

This and other objects as well as features and advantages of the present invention will become apparent from the following detailed description of the preferred embodiments when taken in conjunction with the accompanying drawings.

BRIEF DESCRIPTION OF THE DRAWINGS

FIG. 17 are views to explain two kinds of powers generated in the case where a hologram element is applied to a base member having a spherical shape. Specifically.

DETAILED DESCRIPTION OF THE PREFERRED EMBODIMENTS

Figure 1:
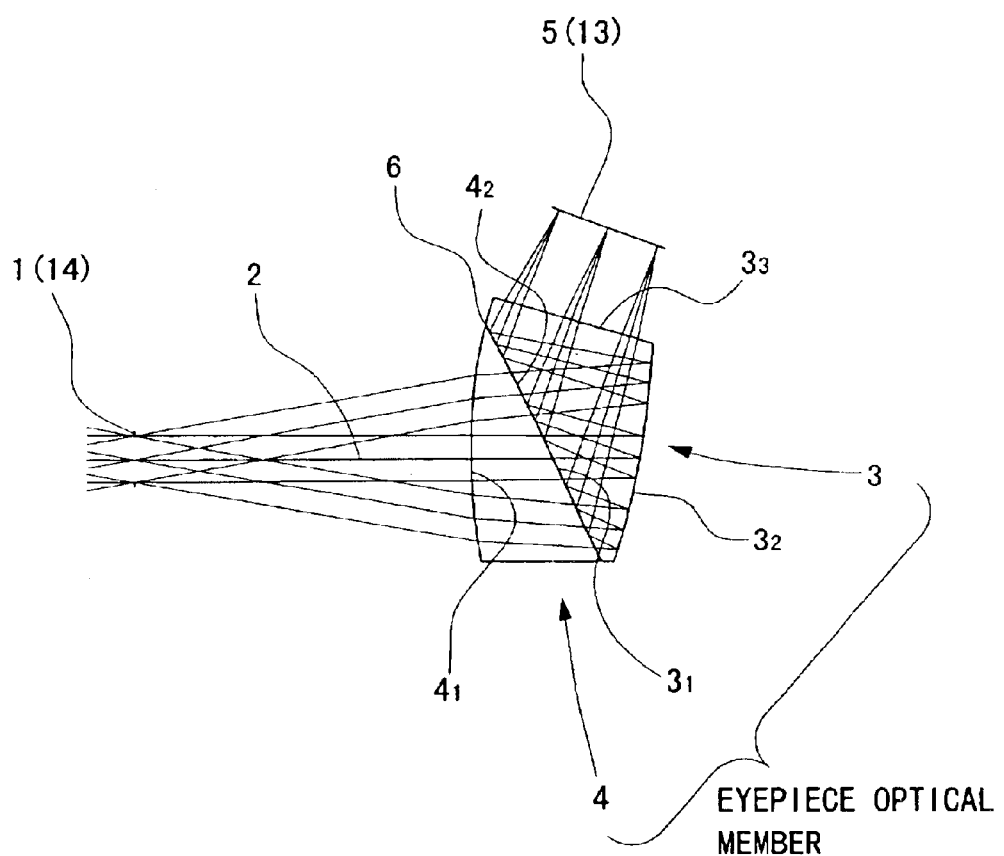
FIG. 1 is a sectional view of an optical system according to the first embodiment of the present invention taken along Y-Z plane in which the optical axis lies.

Now, description will be made of embodiments of the observation optical system and the photographing optical system according to the present invention. In the embodiments, as shown in FIG. 1 for example, an axial chief ray 2 is defined as a ray travelling from the center (i. e. the rotation center of an eyeball of an observer) of an exit pupil 1 (or the center of an aperture stop 14) to the center of a LCD 5 which is provided as an observation image forming member (or the center of an image pickup element 13) via a second prism 4 and a first prism 3. The optical axis, which is defined by the straight line portion of the axial chief ray 2 from the exit pupil to the intersection with the exit pupil-side surface of the second prism 4, is defined as Z axis. The axis that intersects Z axis at right angles and that lies in a plane of decentering for each surface constituting the prisms is defined as Y axis. The axis that intersects the optical axis and Y axis at right angles is defined as X axis. The center of the exit pupil 1 (or aperture stop 14) is determined as the origin of this coordinate system. The direction of the axial chief ray 2 from the exit pupil 1 (or aperture stop 14) toward the LCD 5 (or image pickup element 13) is defined as a positive direction of Z axis. A direction of Y axis that is toward the LCD 5 (or image pickup element 13) is defined as a positive direction of Y axis. A direction of X axis that forms a right hand system along with Y axis and Z axis is defined as a positive direction of X axis.

In the embodiments, the first prism and the second prism are decentered in Y-Z plane in this coordinate system. Also, each rotationally asymmetric surface provided for the first prism and the second prism has the only plane of symmetry on Y-Z plane.

For each decentered surface, amount of displacement (expressed by X, Y, Z for components in X-axis direction, Y-axis direction, Z-axis direction, respectively) of the vertex position of the surface from the origin of the corresponding coordinate system and tilt angles ($\alpha$, $\beta$, $\gamma(°)$) of the center axis (=Z axis in Equation (7) for a free curved surface) of the surface in reference to X axis, Y axis and Z axis, respectively, are given. A positive value of $\alpha$ or $\beta$ means counterclockwise rotation in reference to the positive direction of the corresponding axis, while a positive value of $\gamma$ means clockwise rotation in reference to the positive direction of Z axis. Other parameters such as radius of curvature of spherical surface, surface separation, refractive index of medium, and Abbe's number are given by the conventional method.

As discussed above, the configuration of the free curved surface used in the present invention is defined by Equation (3), where Z axis corresponds the axis of the free curved surface.

The free curved surface can be defined by Zernike polynomial, also. The configuration of the surface is defined by the following equations (11). Z axis appearing in Equation (11) represents the axis of Zernike polynomial. The rotationally asymmetric surface is defined by height in Z axis, in terms of polar coordinate, in reference to X-Y plane.

$$X = R \times \cos(A) \quad (11)$$

$$Y = R \times \sin(A)$$

$$Z = D_2 + D_3 R\cos(A) + D_4 R\sin(A) + D_5 R^2\cos(2A) +$$

$$D_6(R^2 - 1) + D_7 R^2\sin(2A) + D_8 R^3\cos(3A) +$$

$$D_9(3R^3 - 2R)\cos(A) + D_{10}(3R^3 - 2R)\sin(A) +$$

$$D_{11}R^3\sin(3A) + D_{12}R^4\cos(4A) +$$

$$D_{13}(4R^4 - 3R^2)\cos(2A) + D_{14}(6R^4 - 6R^2 + 1) +$$

$$D_{15}(4R^4 - 3R^2)\sin(2A) +$$

$$D_{16}R^4\sin(4A) + D_{17}R^5\cos(5A) +$$

$$D_{18}(5R^5 - 4R^3)\cos(3A) + D_{19}(10R^5 - 12R^3 + 3R)\cos(A) +$$

-continued $$D_{20}(10R^5 - 12R^3 + 3R)\sin(A) + D_{21}(5R^5 - 4R^3)\sin(3A) +$$

$$D_{22}R^5\sin(5A) + D_{23}R^6\cos(6A) +$$

$$D_{24}(6R^6 - 5R^4)\cos(4A) +$$

$$D_{25}(15R^6 - 20R^4 + 6R^2)\cos(2A) +$$

$$D_{26}(20R^6 - 30R^4 + 12R^2 - 1) +$$

$$D_{27}(15R^6 - 20R^4 + 6R^2)\sin(2A) +$$

$$D_{28}(6R^6 - 5R^4)\sin(4A) + D_{29}R^6\sin(6A) \ldots$$

where R is a distance from Z axis in X-Y plane, A is an azimuth about Z axis expressed by a rotation angle from Y axis, and $D_m$ (m is integer equal to or greater than 2) is a coefficient. It is noted that Equation (11) corresponds to a free curved surface that is symmetric in X direction.

Configuration of a rotationally asymmetric free curved surface can be defined by the following equation (12) also. Z axis in Equation (12) corresponds to the axis of the rotationally asymmetric surface.

$$Z = \Sigma_n \Sigma_m C_{nm} X^n Y^{n-m} \quad (12)$$

where $\Sigma_n$ is the sum where n is from 0 to k, and $\Sigma_m$ is the sum where m is from 0 to n.

For defining a plane-symmetric free curved surface (a rotationally asymmetric surface having only one plane of symmetry), Equation (12), which expresses a rotationally asymmetric surface, may be used upon all its terms with odd-numbered powers of X being nullified (by, for example, coefficients of the terms with odd-numbered powers of X set to zero) in the case where symmetry of the surface appears along X direction, or upon all its terms with odd-numbered powers of Y being nullified (by, for example, coefficients of the terms with odd-numbered powers of Y set to zero) in the case where symmetry of the surface appears along Y direction.

Configuration of a rotationally symmetric aspherical surface is defined by the following equation (13). Z axis appearing in Equation (13) represents the axis of the rotationally symmetric aspherical surface.

$$Z = (Y^2/R)/[1 + \{1 - P(Y^2/R^2)\}^{1/2}] + A_4 Y^4 + A_6 Y^6 + A_8 Y^8 + A_{10} Y^{10} \ldots \quad (13)$$

where Y is a direction perpendicular to Z, R is a radius of paraxial curvature, P is a conical coefficient, and $A_4$, $A_6$, $A_8$, $A_{10}$ are aspherical coefficients.

Configuration of the free curved surface used in the embodiments of the present invention is expressed by means of Equation (3). However, even if Equation (11) or Equation (12) is applied, it does not affect the function and effect of the invention, as a matter of course.

First Embodiment

This embodiment is explained as an image display apparatus using an observation optical system.

FIG. 1 shows a sectional view of the observation optical system according to the first embodiment of the present invention taken along Y-Z plane in which the optical axis lies. The observation optical system according to the first embodiment includes a LCD 5 disposed on the image surface side as an image forming member on which an image to be viewed by the observer is displayed, and an eyepiece optical member which introduces the observation image formed by the image forming member to the exit pupil 1 formed at the position of the eye (pupil surface) of the observer for observation by the observer.

The eyepiece optical member includes a first prism 3 and a second prism 4.

In the description of each embodiment, surface arrangement numbers are assigned in order from the exit pupil 1 through the LCD 5 (reverse ray tracing). Description of arrangement order of the surfaces in the first prism and the second prism also conforms to the reverse ray tracing. Also, bundles of rays which travel, via the optical system, in a path between the exit pupil 1 and the LCD 5 is called first bundles of rays.

The first prism 3 has a first entrance surface $3_3$, a reflecting surface $3_2$ and a first exit surface $3_1$ with a transparent prism medium such as glass or plastic between.

The second prism 4 has a second entrance surface $4_2$ and a second exit surface $4_1$ with a transparent prism medium such as glass or plastic between.

The first prism 3 and the second prism 4 are joined to each other via a reflection-type volume hologram 6 as a hologram element (HOE) interposed between.

The prism medium of the first prism 3 and the prism medium of the second prism 4 are made of the same material, e.g., both made of glass or both made of plastic.

The first entrance surface $3_3$ of the first prism 3 is disposed on the LCD 5 side and has the action of causing rays from the observation image to enter the first prism 3 by transmitting them, and is shaped as a free curved surface defining only one plane of symmetry so as to give a power for the rays transmitted therethrough.

The reflecting surface $3_2$ has the action of reflecting the rays inside the first prism 3 and is shaped as a concave curved surface (in this case, a free curved surface) to give a positive power for rays reflected therefrom. The reflecting surface $3_2$ is provided with a mirror coating.

The first exit surface $3_1$ has the action of causing the rays to exit out of the first prism 3 and is shaped as a rotationally symmetric spherical surface.

The second entrance surface $4_2$ of the second prism is disposed on the side of the first prism 3, and has the action of causing the rays emergent from the first prism 3 to enter the second prism 4 by transmitting them. The second entrance surface $4_2$ is shaped as a rotationally symmetric spherical surface.

The second exit surface $4_1$ has the action of causing the rays to exit out of the second prism 4 and is shaped as a free curved surface defining only one plane of symmetry to give a power for rays transmitted therethrough. The second exit surface $4_1$ has the action of compensating at least one of those rotationally asymmetric aberrations including a rotationally asymmetric coma and a rotationally asymmetric astigmatism, which are generated at the eyepiece optical member.

The only one plane of symmetry of each of the free curved surfaces of the first entrance surface $3_3$ of the first prism 3 and the second exit surface $4_1$ of the second prism 4 coincides with a plane (Y-Z plane) in which the optical axis is folded.

Also, the rotationally symmetric spherical shape of the first exit surface $3_1$ of the first prism 3 and the rotationally symmetric spherical shape of the second entrance surface $4_2$ of the second prism 4 are substantially congruent.

As described above, the volume hologram 6 is constructed and arranged so as to reflect by diffraction the first bundles of rays as they are incident thereon at the first incident angle (for example, 45.1° for rays with wavelength of 520 nm), and to transmit the first bundles of rays as they are incident thereon at an incident angle other then the first incident angle.

In the observation optical system of the present embodiment, after entering the first prism 3 via transmission through the first entrance surface $3_1$, the first bundles of rays from the LCD 5 are incident on the volume hologram 6, which is applied to the first exit surface $3_3$, at the first incident angle. Here, the first bundles of rays are reflected by diffraction at a reflecting diffraction efficiency of nearly 100%, are directed toward and reflected at the reflecting surface $3_2$, and then are incident on the volume hologram 6 applied to the first exit surface $3_1$ at an incident angle other than the first incident angle. Since the incident angle, this time, is out of the range of the angular selectivity of the volume hologram 6 within which high diffraction efficiency is assured, the first bundles of rays are transmitted through the volume hologram 6, to exit out of the first prism 3. Then, the first bundles of rays enter the second prism 2 via transmission through the second entrance surface $4_1$ of the second prism 4, and exit out of the second prism 4 via transmission through the second exit surface $4_2$, to be introduced to the exit pupil 1.

It is noted that the embodiments of the present invention are explained as observation optical. systems. However, if the LCD 5 on the image surface is replaced by an image pickup element 13 and an aperture stop 14 which regulates brightness of a beam of rays emergent from an object is disposed on the pupil surface (at the position of the exit pupil 1), the optical system can be configured as a photographing optical system.

In this case, the first entrance surface $3_3$ of the first prism 3 acts as an exit surface (a fourth exit surface) which causes rays to exit out of the first prism 3, and the first exit surface $3_1$ acts as an entrance surface (a fourth entrance surface) which causes rays emergent from the second prism 4 to enter the first prism 3. Also, the second entrance surface $4_2$ of the second prism 4 acts as an exit surface (a third exit surface) which causes rays to exit out of the second prism 4, and the second exit surface $4_1$ acts as an entrance surface (a third entrance surface) which causes rays from the object passing through the aperture stop 14 to enter the second prism 4.

If the present invention is configured as a photographing optical system, rays from the object passing through the aperture stop 14 are, upon entering the second prism 4 via transmission through the third entrance surface $4_1$, incident on the volume hologram 6 applied to the third exit surface $4_2$ of the second prism 4 at an incident angle other than the first incident angle. Here, since the incident angle is out of the range of the angular selectivity of the volume hologram 6 within which high diffraction efficiency is assured, the first bundles of rays are transmitted through the volume hologram 6, to exit out of the second prism 4, and then enter the first prism 3 via transmission through the fourth entrance surface $3_1$ of the first prism. Then, the bundles of rays are directed to and reflected from the reflecting surface $3_2$ of the first prism 3, to be incident on the volume hologram 6 applied to the fourth entrance surface $3_1$ substantially at the first incident angle (45.2° for a ray with 520 nm wavelength). Here, the first bundles of rays are reflected by diffraction at a reflecting diffraction efficiency of nearly 100%, and exit out of the first prism 3 via transmission through the fourth exit surface $3_3$, to be introduced to the image pickup element 13.

Also, the volume hologram 6 is constructed of three layers for R, G, B, so that a color image can be observed.

The numerical data of the first embodiment is shown below. In the data, "FFS" indicates free curved surface.

The image display element used in the present embodiment is a LCD that has diagonal length of 0.7 inch, aspect ratio of 16:9, dimensions of 8.72 mm height×15.50 mm width, and center diopter of −1.0D. Regarding the view field angle, horizontal half angle is 18.0° and vertical half angle is 10.36°. Pupil diameter Φ is 4.0 mm, and eye relief of 28.0 mm.

Figure 2:
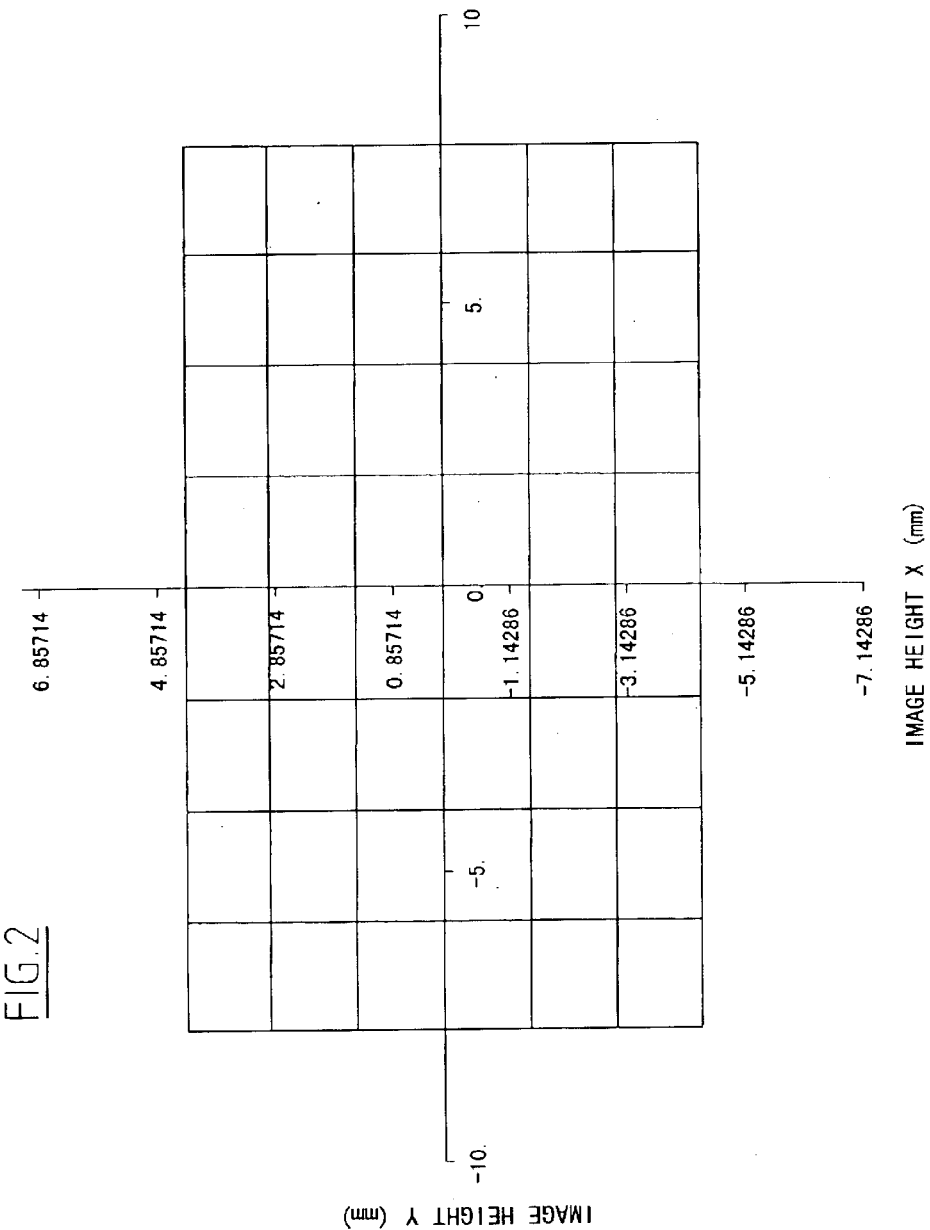
FIG. 2 is an aberration diagram showing the image distortion of the first embodiment.
Figure 3A:
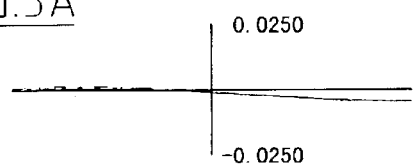
FIG. 3 are aberration diagrams showing the lateral aberrations in R band (red band) of the first embodiment.
Figure 3B:
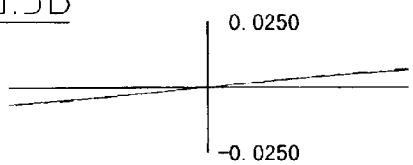
Figure 3C:
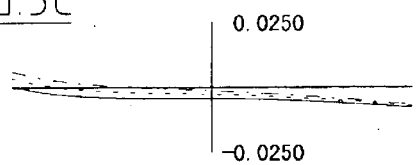
Figure 3D:
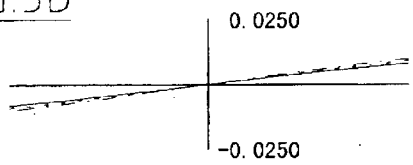
Figure 3E:
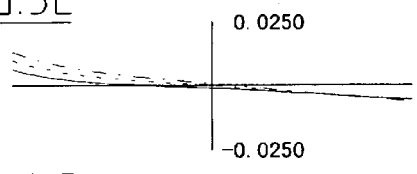
Figure 3F:
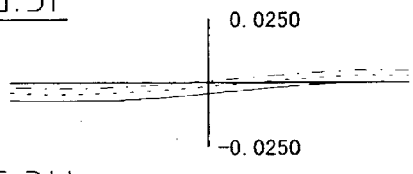
Figure 3G:
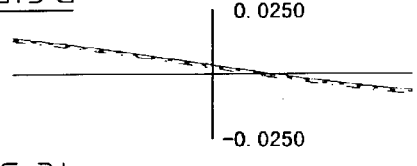
Figure 3H:
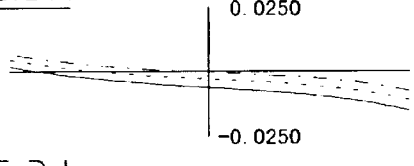
Figure 3I:
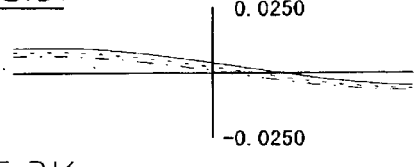
Figure 3J:
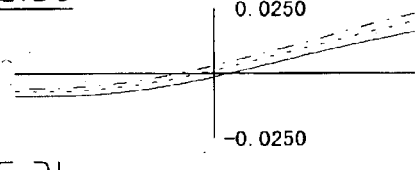
Figure 3K:
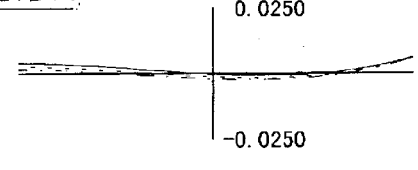
Figure 3L:
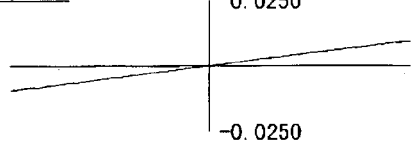
Figure 4A:
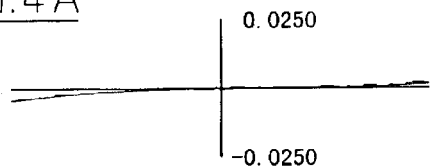
FIG. 4 are aberration diagrams showing the lateral aberrations in G band (green band) of the first embodiment.
Figure 4B:
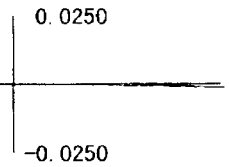
Figure 4C:
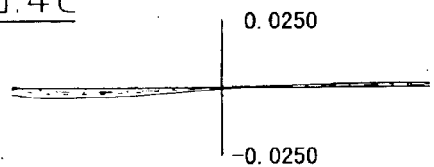
Figure 4D:
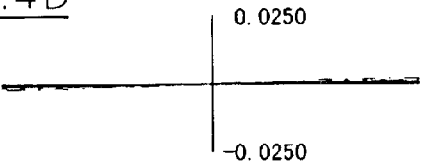
Figure 4E:
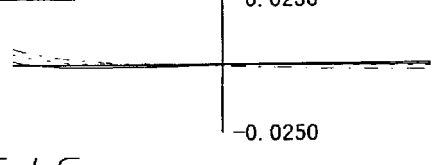
Figure 4F:
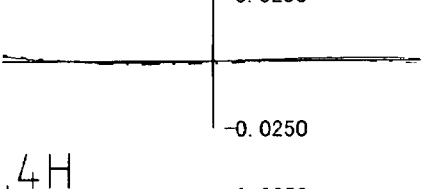
Figure 4G:
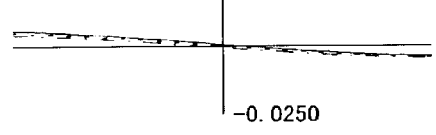
Figure 4H:
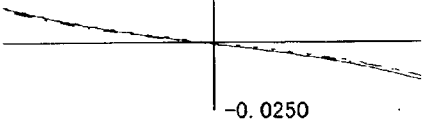
Figure 4I:
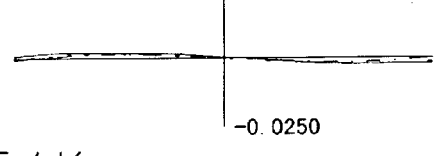
Figure 4J:
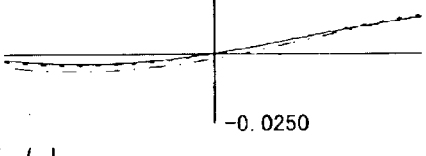
Figure 4K:
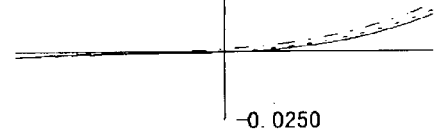
Figure 4L:
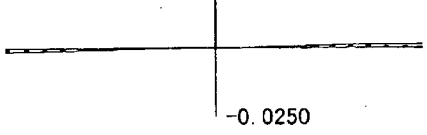
Figure 5A:
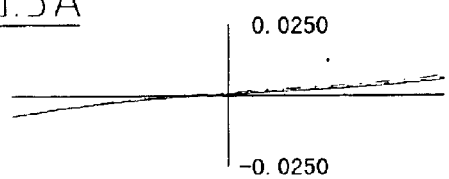
FIG. 5 are aberration diagrams showing the lateral aberrations in B band (blue band) of the first embodiment.
Figure 5B:
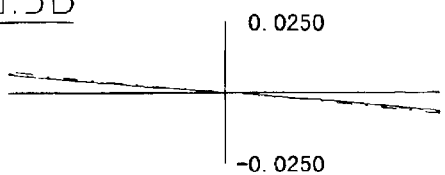
Figure 5C:
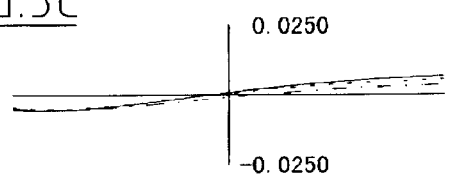
Figure 5D:
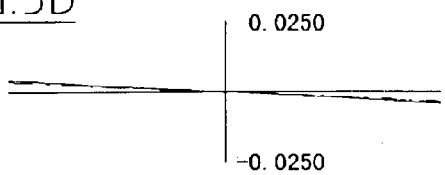
Figure 5E:
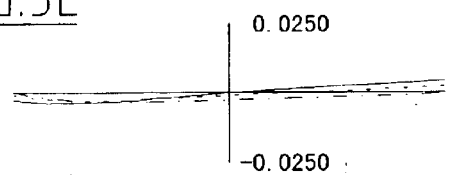
Figure 5F:
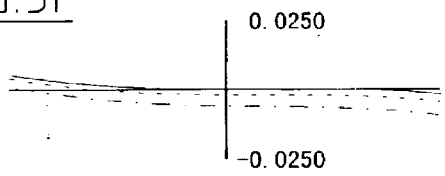
Figure 5G:
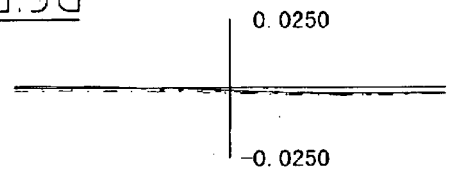
Figure 5H:
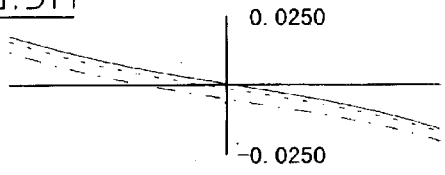
Figure 5I:
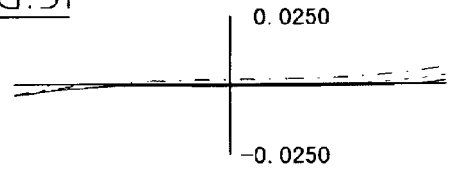
Figure 5J:
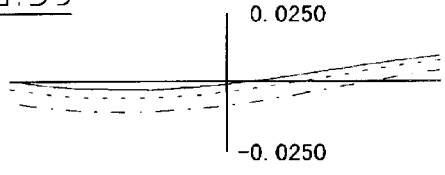
Figure 5K:
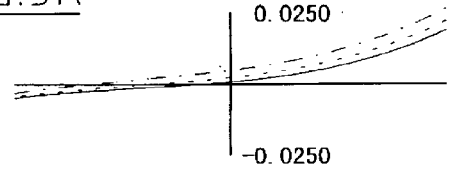
Figure 5L:
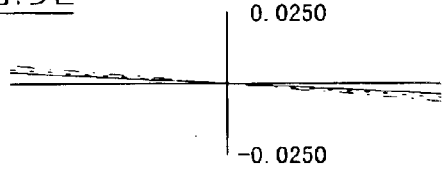

Also, regarding the present embodiment, an aberration diagram presenting image distortion is shown in FIG. 2, and aberration diagrams presenting lateral aberrations in the wavelength regions of R, G, B are shown in FIGS. 3-5, respectively. In FIG. 2, the ordinate represents image height in X direction, and the abscissa represents image height in Y direction. Of FIGS. 3-5, each of FIG. 3A, FIG. 4A, FIG. 5A shows lateral aberration in Y direction of a chief ray that traverses a point where field angle in X direction is zero and field angle in Y direction is zero; each of FIG. 3B, FIG. 4B, FIG. 5B shows lateral aberration in X direction of the chief ray that traverses the point where field angle in X direction is zero and field angle in Y direction is zero; each of FIG. 3C, FIG. 4C, FIG. 5C shows lateral aberration in Y direction of a chief ray that traverses a point where field angle in X direction is zero and field angle in Y negative direction is maximum; each of FIG. 3D, FIG. 4D, FIG. 5D shows lateral aberration in X direction of the chief ray that traverses the point where field angle in X direction is zero and field angle in Y negative direction is maximum; each of FIG. 3E, FIG. 4E, FIG. 5E shows lateral aberration in Y direction of a chief ray that traverses a point where field angle in X positive direction is maximum and field angle in Y negative direction is maximum; each of FIGS. 3F, 4F, 5F shows lateral aberration in X direction of the chief ray that traverses the point where field angle in X positive direction is maximum and field angle in Y negative direction is maximum; each of FIG. 3G, FIG. 4G, FIG. 5G shows lateral aberration in Y direction of a chief ray that traverses a point where field angle in X positive direction is maximum and field angle in Y direction is zero; each of FIG. 3H, FIG. 4H, FIG. 5H shows lateral aberration in X direction of the chief ray that traverses the point where field angle in X positive direction is maximum and field angle in Y direction is zero; each of FIG. 3I, FIG. 4I, FIG. 5I shows lateral aberration in Y direction of a chief ray that traverses a point where field angle in X positive direction is maximum and field angle in Y positive direction is maximum; each of FIG. 3J, FIG. 4J, FIG. 5J shows lateral aberration in X direction of the chief ray that traverses the point where field angle in X positive direction is maximum and field angle in Y positive direction is maximum; each of FIG. 3K, FIG. 4K, FIG. 5K shows lateral aberration in Y direction of a chief ray that traverses a point where field angle in X direction is zero and field angle in Y positive direction is maximum; and each of FIG. 3L, FIG. 4L, FIG. 5L shows lateral aberration in X direction of the chief ray that traverses the point where field angle in X direction is zero and field angle in Y positive direction is maximum.

Numerical Data 1

| Surface Arrange. Number | Radius of Curvature | Surface Separation | Decentering | Refractive Index | Abbe's Number | Hologram Surface |
|---|---|---|---|---|---|---|
| object surface | ∞ | −1000.00 | | | | |
| 1 pupil surface | | 0.00 | decentering[1] | | | |
| 2 | ∞ | 0.00 | decentering[1] | | | |
| 3 | FFS[1] | 0.00 | decentering[2] | 1.5254 | 56.2 | |
| 4 | −336.24 | 0.00 | decentering[3] | 1.5254 | 56.2 | |
| 5 | FFS[2] reflecting surface | 0.00 | decentering[4] | 1.5254 | 56.2 | |
| 6 | −336.24 reflecting surface | 0.00 | decentering[3] | 1.5254 | 56.2 | HOE[1] |
| 7 | FFS[3] | 0.00 | decentering[5] | | | |
| image surface | ∞ | 0.00 | decentering[6] | | | |

FFS [1]:

$C_4 = 1.5679 \times 10^{-2}$  $C_6 = 9.0751 \times 10^{-3}$  $C_8 = 6.2743 \times 10^{-5}$
$C_{10} = 1.0057 \times 10^{-4}$  $C_{11} = -1.0704 \times 10^{-5}$  $C_{13} = -1.1886 \times 10^{-5}$
$C_{15} = 8.8661 \times 10^{-6}$

FFS [2]:

$C_4 = -4.6962 \times 10^{-3}$  $C_6 = -6.9440 \times 10^{-3}$  $C_8 = 4.2884 \times 10^{-5}$
$C_{10} = 8.4545 \times 10^{-6}$  $C_{11} = -3.5550 \times 10^{-6}$  $C_{13} = -5.3008 \times 10^{-6}$
$C_{15} = 1.1914 \times 10^{-6}$

FFS [3]:

$C_4 = -8.9686 \times 10^{-3}$  $C_6 = 4.6783 \times 10^{-6}$  $C_8 = 8.2000 \times 10^{-4}$
$C_{10} = -1.4251 \times 10^{-4}$  $C_{11} = 8.6965 \times 10^{-5}$  $C_{13} = 1.8101 \times 10^{-4}$
$C_{15} = -2.3085 \times 10^{-5}$

HOE [1]:

HV1 = REA  HV2 = REA  HOR = 1
HX1 = 0.0  HY1 = 0.0  HZ1 = 0.0
HX2 = 0.0  HY2 = 0.0  HZ2 = 0.0
HWL (1st layer) = 630  HWL (2nd layer) = 520  HWL (3rd layer) = 470
$H_2 = -1.1578 \times 10^{-3}$  $H_3 = -1.4299 \times 10^{-3}$  $H_5 = -5.2803 \times 10^{-4}$
$H_7 = -1.4783 \times 10^{-5}$  $H_9 = -2.6225 \times 10^{-5}$  $H_{10} = 1.8756 \times 10^{-6}$
$H_{12} = 1.3012 \times 10^{-6}$  $H_{14} = -7.7046 \times 10^{-7}$  $H_{16} = -1.4138 \times 10^{-7}$
$H_{18} = -3.9777 \times 10^{-8}$  $H_{20} = 1.1893 \times 10^{-7}$  $H_{21} = -3.1739 \times 10^{-9}$
$H_{23} = -5.9630 \times 10^{-9}$  $H_{25} = -5.4274 \times 10^{-9}$  $H_{27} = 6.9417 \times 10^{-9}$ Decentering [1]:

X = 0.00  Y = 0.00  Z = 0.00
α = 0.00  β = 0.00  γ = 0.00

Decentering [2]:

X = 0.00  Y = 1.98  Z = 28.00
α = −1.17  β = 0.00  γ = 0.00

Decentering [3]:

X = 0.00  Y = 4.11  Z = 32.88
α = 25.72  β = 0.00  γ = 0.00

Decentering [4]:

X = 0.00  Y = −1.55  Z = 41.74
α = −10.96  β = 0.00  γ = 0.00

Decentering [5]:

X = 0.00  Y = 12.63  Z = 33.86
α = 73.84  β = 0.00  γ = 0.00

Decentering [6]:

X = 0.00  Y = 19.76  Z = 39.40
α = −111.02  β = 0.00  γ = 0.00

Conditions
  Condition (1), (2): |θ|=65.05°

Second Embodiment

Figure 6:
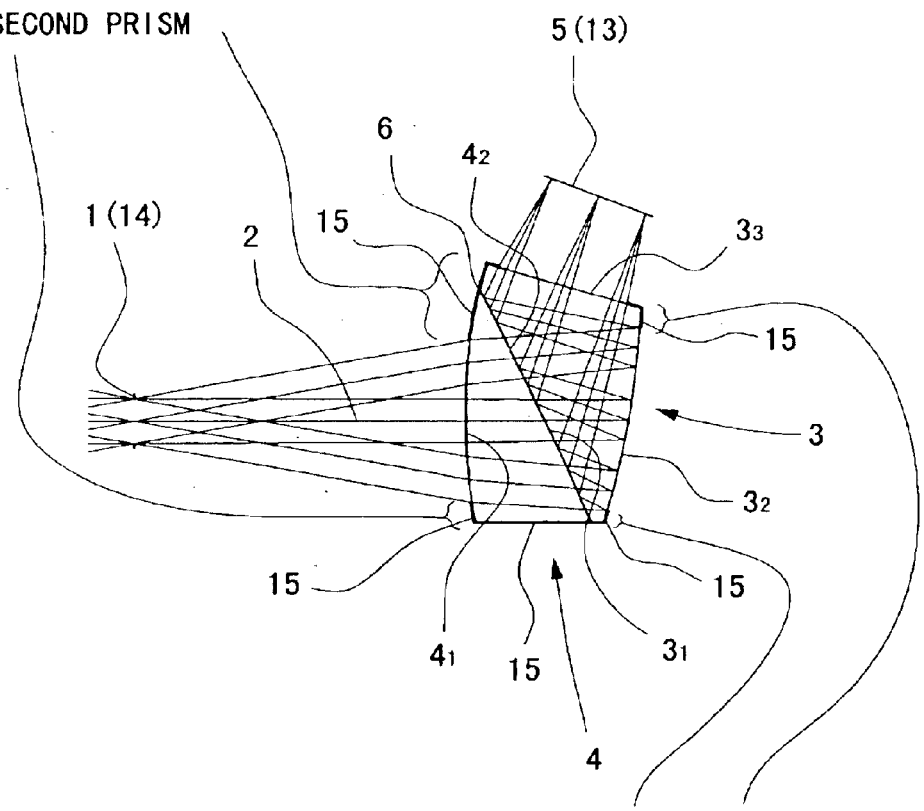
FIG. 6 is a sectional view of an optical system according to the second embodiment of the present invention taken along Y-Z plane in which the optical axis lies.
Figure 7:
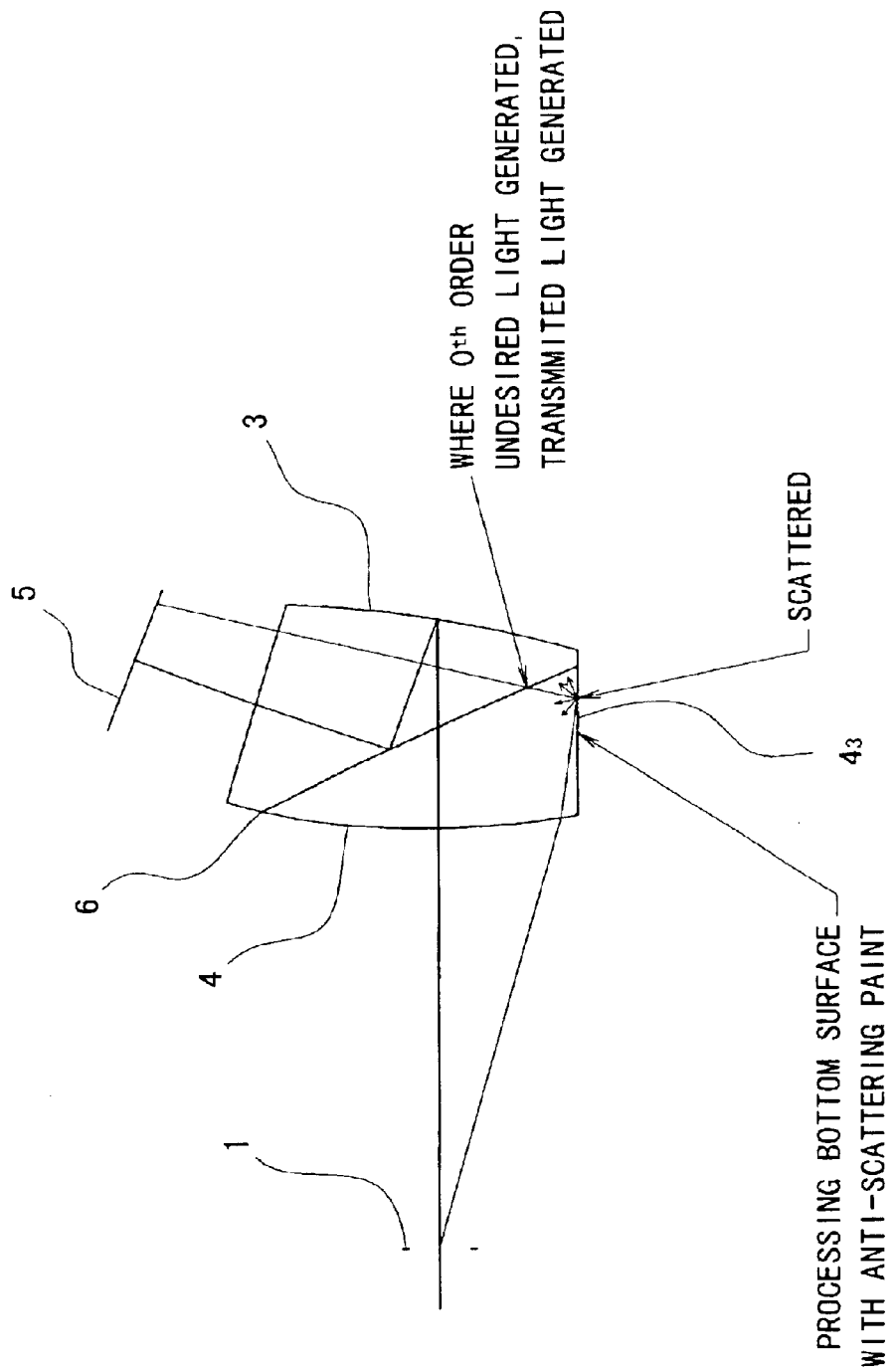
FIG. 7 is an explanatory view to show that light transmitted through the hologram element without diffraction gives bad affection as ghost light in the configuration of the first embodiment.

The second embodiment of the present invention is shown in FIG. 6. FIG. 6 is a sectional view of the essential part of an observation optical system according to the second embodiment taken along Y-Z plane in which the optical axis lies. FIG. 7 is an explanatory view to show that light transmitted through the hologram element without diffraction gives bad affection as ghost light in the configuration of the first embodiment.

Figure 21:
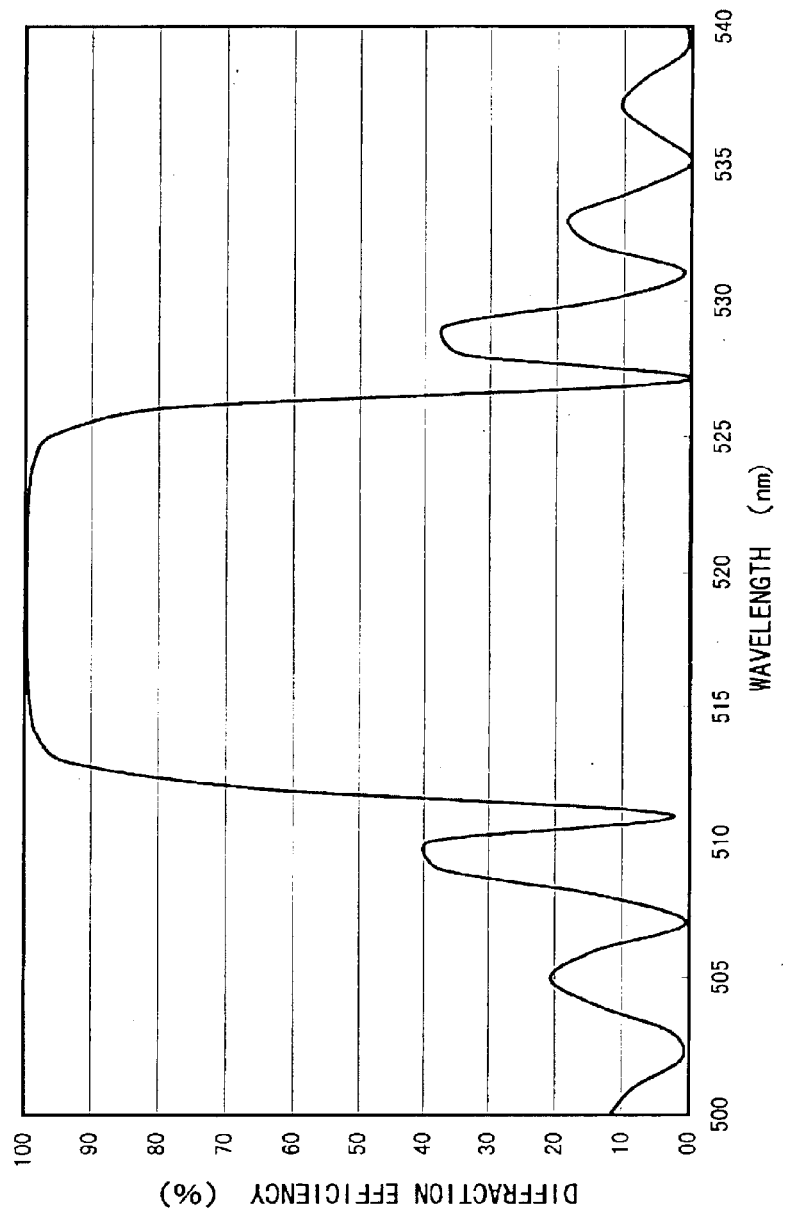
FIG. 21 is a graph in which the diffraction efficiency at the volume hologram surface of the present invention for the axial chief ray forming the incident angle of 45.1° is plotted against the wavelength.

In the configuration of the first embodiment, even if bundles of rays are incident on the volume hologram 6 at the first incident angle, rays in predetermined wavelength regions fail to be subject to 100% reflection by diffraction, as shown in FIG. 21, for example. A very small amount of undesired order rays, which are not reflected by diffraction, are generated, to be transmitted light.

The transmitted light impinges, for example, on the bottom surface $4_3$ shown in FIG. 7 or on side surfaces (the surfaces in front of or behind the figure) of the eyepiece optical system, so that light reflected therefrom may be received, as ghost light, by the eye of the observer.

Therefore, according to the present embodiment, as shown in FIG. 6, in addition to the configuration of the first embodiment, a member having light absorbing property, such as a black paint, is provided as a ghost light removing member to be applied to the side surfaces of the first prism 3 and the side surfaces and the bottom surface $4_3$ of the second prism 4, by paint process or the like. It is noted that, according to the present embodiment, the ghost light removing member 15 is provided also at portions defined as optically non-operative faces (faces in the first prism 3 and the second prism 4 other than optically operative faces used to transmit or reflect the first bundles of rays), such as a region outside the effective diameter for rays on the first entrance surface $3_3$ of the first prism 3, a region outside the effective diameter for rays on the reflecting surface $3_2$ of the first prism, and a region outside the effective diameter for rays on the second exit surface $4_1$ of the second prism 4.

The observation optical system and the photographing optical system of the present invention as described in the foregoing embodiments are applicable to an observation apparatus, which provides an observer with a view of an object image via an eyepiece, and to a photographing apparatus, which performs photographing by forming an object image and making it received on an image pickup element such as a CCD or a silver halide film. These apparatuses include a microscope, a head-mount type image display apparatus, an endoscope, a projector, a silver halide film camera, a digital camera, a VTR camera, etc. Application examples are described below.

Figure 8:
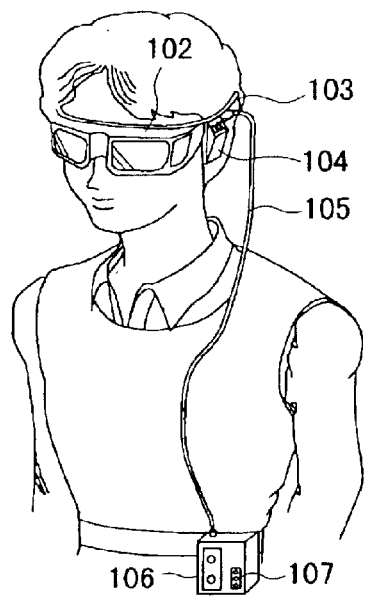
FIG. 8 is a perspective view of a head-mount type binocular image display apparatus using the observation optical system according to the present invention, as it is fit to the head of an observer.
Figure 9:
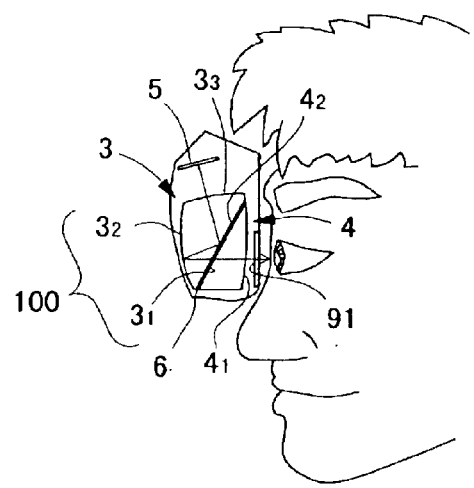
FIG. 9 is a sectional view of the apparatus shown in FIG. 8.

As an example, a head-mount type binocular image display apparatus is shown in FIG. 8, as it is fit to the head of an observer, and in FIG. 9 in the form of a sectional view. As shown in FIG. 9, this apparatus is configured to use the observation optical system according to the present invention as an eyepiece optical system 100 provided with an image display element 5. A pair of such eyepiece optical systems 100 are provided and held spaced away from each other by the interpupillary distance, to form a stationary type or portable type image display apparatus 102 such as a head-mount type image display apparatus for binocular observation.

The above-described observation optical system is used in a main frame 102 of the image display apparatus as an eyepiece optical system 100. A pair of such eyepiece optical systems 100 are provided as left and right systems. Image display elements 5 constructed of liquid crystal display elements are disposed on the respective image surfaces of the optical systems. As shown in FIG. 8, side-head frames 103 are coupled to the main frame 102 on the lateral sides thereof so as to hold the main frame 102 in front of the eyes of the observer. As shown in FIG. 9, a cover member 91 is disposed between the exit pupil of the eyepiece optical system 100 and the second exit surface $4_1$ of the second prism 4 of the eyepiece optical system 100. The cover member 91 may be any one of a plane parallel plate, a positive lens and a negative lens.

Also, each of the side-head frame 103 is equipped with a speaker 104 so that the observer can enjoy stereophony, in addition to the image. The main frame 102 provided with the speakers 104 as described above is connected with a player unit 106 for a portable video cassette or the like via a video/audio transmission cord 105. The observer can enjoy image and sound upon holding the player unit 106 to an arbitrary position, for example to her or his waist belt position, as shown in the drawing. In FIG. 8, the reference numeral 107 represents a control section including a switch, a volume control etc. of the player unit 106. Electronic devices such as video processing and audio processing circuits are built in the main frame 102.

The end of the cord 105 may be formed as a jack to be plugged in an existing video deck etc. Also, the cord 105 may be connected with a TV tuner, which receives broadcasting waves, for observation of TV programs, or may be connected with a computer to receive images of computer graphics or text messages. Alternatively, the apparatus may be provided with an antenna for receiving external signals carried by radio waves, for the purpose of removing the cord, which is obstructive.

Figure 10:
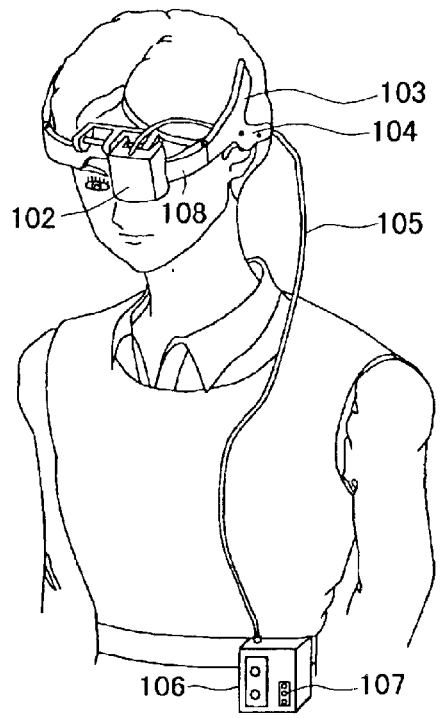
FIG. 10 is a perspective view of a head-mount type monocular image display apparatus using the observation optical system according to the present invention, as it is fit to the head of an observer.

Also, the observation optical system according to the present invention may be applied to a head-mount type monocular image display apparatus, which is designed so that an eyepiece optical system is held in front of either eye of an observer. FIG. 10 shows the condition where the monocular image display apparatus is held to the head (in the drawing, in front of the left eye) of the observer. In this configuration, a main frame 102 which is provided with a set including an eyepiece optical system 100 and an image display element 5 is mounted on a front frame 108 at a position in front of the corresponding eye. Side-head frames 103 shown in the figure are coupled to the front frame 108 on the lateral sides thereof so as to hold the main frame 102 in front of the odd eye of the observer. Other features are similar to those of the foregoing binocular configuration shown in FIG. 8, and thus explanation about them is omitted here.

Figure 11:
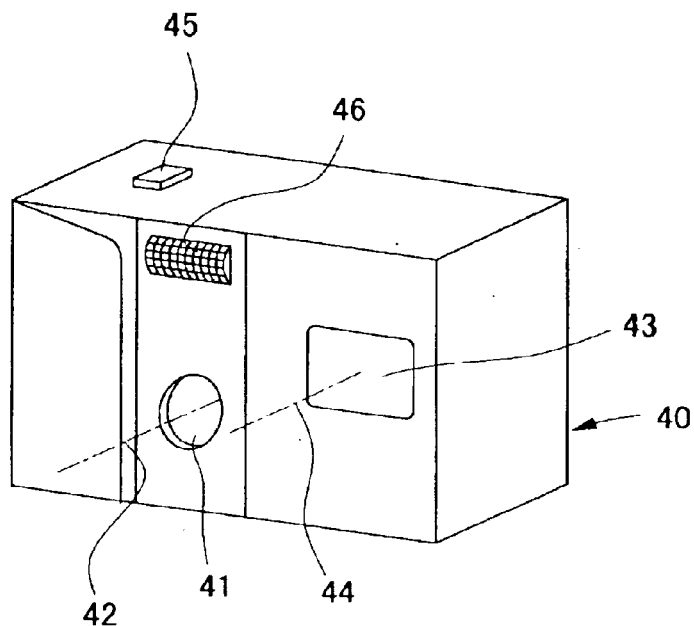
FIG. 11 is a perspective view showing the front side appearance of an electronic camera to which the photographing optical system and the observation optical system according to the present invention are applied.
Figure 12:
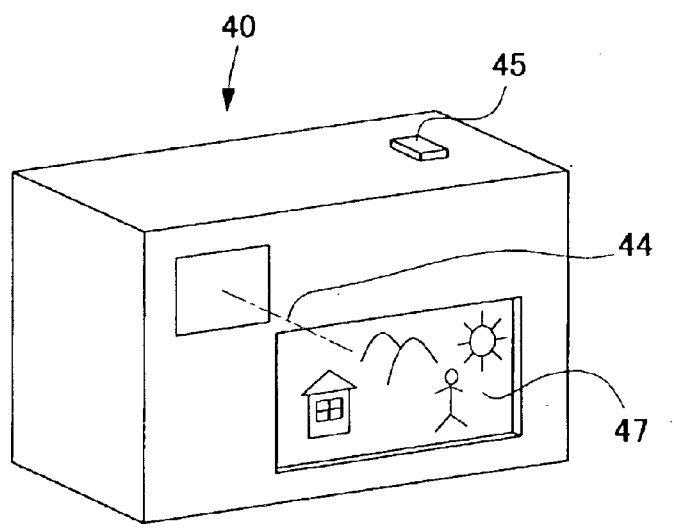
FIG. 12 is a perspective view showing the rear side appearance of the electronic camera of FIG. 11.
Figure 13:
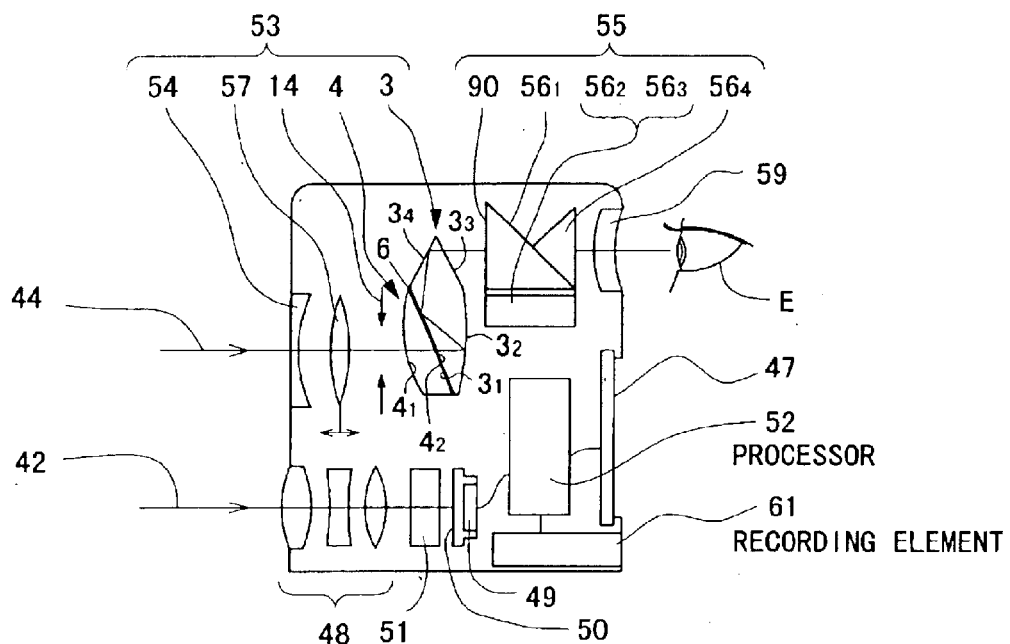
FIG. 13 is a sectional view showing one example of configuration of the electronic camera of FIG. 11.

FIGS. 11-13 are schematic views to show a configuration in which the essential configuration of the photographing optical system according to the present invention is incorporated into an objective optical system of a finder section of an electronic camera. FIG. 11 is a perspective view showing the front slide appearance of the electronic camera 40, FIG. 12 is a perspective view showing the rear side appearance of the same, and FIG. 13 is a sectional view showing the configuration of the electronic camera 40.

In this example, the electronic camera 40 includes a photographing optical system 41 which defines a photographing path 42, a finder optical system 43 which defines a finder path 44, a shutter button 45, a flash 46, and a liquid crystal display monitor 47. When a user pushes the shutter button 45 arranged on the top face of the camera 40, photographing is performed accordingly via a photographing objective optical system 48. An object image by the photographing optical system 48 is formed on an image pickup surface 50 of a CCD 49 via a filter 51 such as a low-pass filter and an infrared cut filter.

The object image received by the CCD 49 is displayed, via a processor 52, on the liquid crystal display monitor 47, which is provided on the back face of the camera, as an electronic image. The processor 52 is provided with a recording element 61 and thus the electronic image as photographed can be recorded. The recording element 61 may be provided separate from the processor 52 or may be configured to perform electronic writing on a floppy disk etc. Also, the camera may be configured as a silver halide camera, which is provided with a silver halide film instead of the CCD 49.

Furthermore, on the finder path 44, a finder objective optical system 53 is provided. The finder objective optical system 53 includes a cover lens 54, a positive lens unit 57 whose position is adjustable in axial directions for focusing, the aperture stop 14, the first prism 3, and the second prism 4. The cover lens 54 used as a cover member is a lens unit having a negative refracting power to widen the field angle. The first prism 3 further includes, in addition to the configuration of the first or second embodiment of the present invention, a reflecting surface $3_4$ disposed in the midst of the path of the rays travelling from the hologram 3 provided on the fourth entrance surface $3_1$, as being reflected by diffraction thereat, to the fourth exit surface $3_3$. The object image formed by the finder objective optical system 53 on an image surface 90 is formed on a field frame in a Porro prism system 55, which is an image erecting member.

The field frame is disposed between a first reflecting surface $56_1$ and a second reflecting surface $56_2$ of the Porro prism system 55. The Porro prism system 55 includes the first reflecting surface $56_1$ through a fourth reflecting surface $56_4$. An eyepiece optical system 59 is disposed behind the Porro prism system 55 to introduce a correctly erected image to an eye E of the observer.

Since the finder objective optical system 53 can be constructed of a small number of optical members in the camera 40 having the above-described configuration, high performance and cost reduction can be achieved. Also, since the path of the objective optical system 53 is folded, the arrangement inside the camera can be more freely designed, which is advantageous.

Regarding the configuration of FIG. 13, the configuration of the photographing objective optical system 48 is not referred to here. However, not limited to the refractive coaxial optical system shown in the drawing, any type of the photographing optical system including the two prisms 3 and 4 as set forth in the first and second embodiments of the present invention can be used as the photographing objective optical system 48, as a matter of course.

Also, any type of the eyepiece optical member including the two prisms 3, 4 as set forth in the first and second embodiments of the present invention may be applied to the eyepiece optical system 59.

Figure 14:
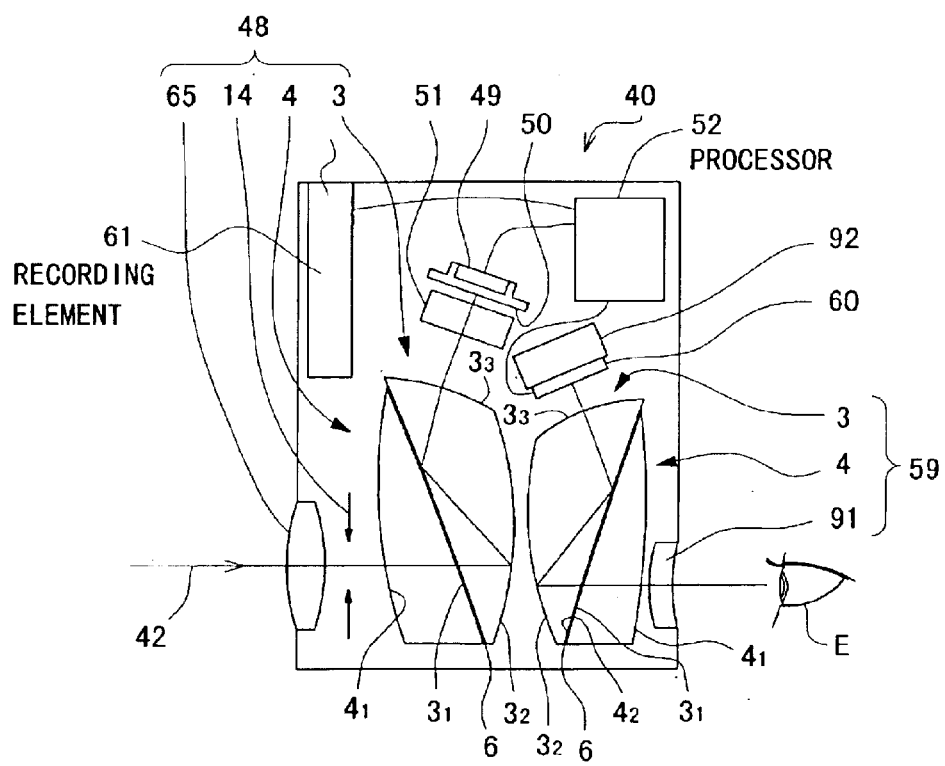
FIG. 14 is a schematic view showing the configuration of another electronic camera to which the photographing optical system and the observation optical system according to the present invention are applied.

FIG. 14 is a schematic view to show a configuration where the photographing optical system of the present invention is incorporated into a photographing objective optical system 48 of an electronic camera 40 and the observation optical system of the present invention is incorporated into an eyepiece optical system 59 of the electronic camera 40. In this example, the photographing objective optical system 48 disposed on the photographing path 42 includes a cover member 65 constructed of a positive lens, and any type of photographing optical system with two prisms 3, 14 of the first and second embodiments of the present invention. A filter 51 such as a low pass filter and an infrared cut filter is disposed between the first prism 3 and a CCD 49. An object image by the photographing optical system 48 is formed on the image pickup surface 50 of the CCD 49. The object image received by the CCD 49 is displayed, via a processor 52, on a liquid crystal display element (LCD) 60, as an electronic image. The processor 52 controls also a recording element 61, which records the photographed object image on the CCD 49 as electronic information. The displayed image on the LCD 60 is introduced to the eye E of the observer via the eyepiece optical system 59.

The eyepiece optical system 59 includes a decentered prism optical system 3, 4 having the configuration similar to the observation optical system of the first and second embodiments of the present invention and a cover lens 91 disposed on the exit pupil side. Behind the LCD 60, a backlight 92 is disposed to illuminate it. The photographing objective optical system 48 may further include another lens (positive lens, negative lens) on the object side or on the image side of the two prisms 3, 4.

Since the photographing objective optical system 48 and the eyepiece optical system 59 can be constructed of a small number of optical members in the camera 40 having the above-described configuration, high performance and cost reduction can be achieved. Also, since the entire optical system can be arranged on a same plane, thickness in the direction perpendicular to this plane can be reduced.

In this example, a positive lens is used as the cover member 65 of the photographing objective optical system 48. However, a negative lens or a plane parallel plate may be used instead of the positive lens.

It is possible to use the most object side surface of the photographing optical system according to the present invention as a cover member also, without providing an additional cover member. In this example, the most object side surface corresponds to the third entrance surface $4_1$ of the second prism 4. However, since the entrance surface $4_1$ is decentered with respect to the optical axis, if it is arranged on the front face of the camera, a person to be photographed would feel that the photographing center of the camera 40 is shifted from him (it is natural to recognize the photographing target to be along the perpendicular to the entrance surface). Therefore, if the most object side surface of the imaging optical system is decentered as in this example, it is desirable to provide a cover member 65 (or a cover lens 54) so that a person can be photographed, as by a normal type camera, without feeling strange.

Figure 15A:
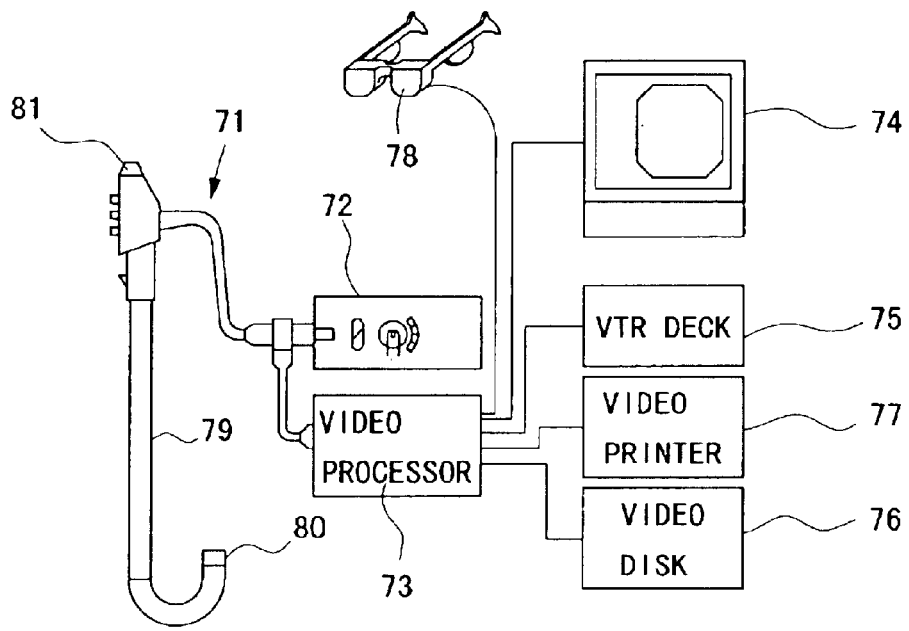
FIG. 15 are schematic views of an electronic endoscope to which the photographing optical system and the observation optical system according to the present invention are applied.
Figure 15B:
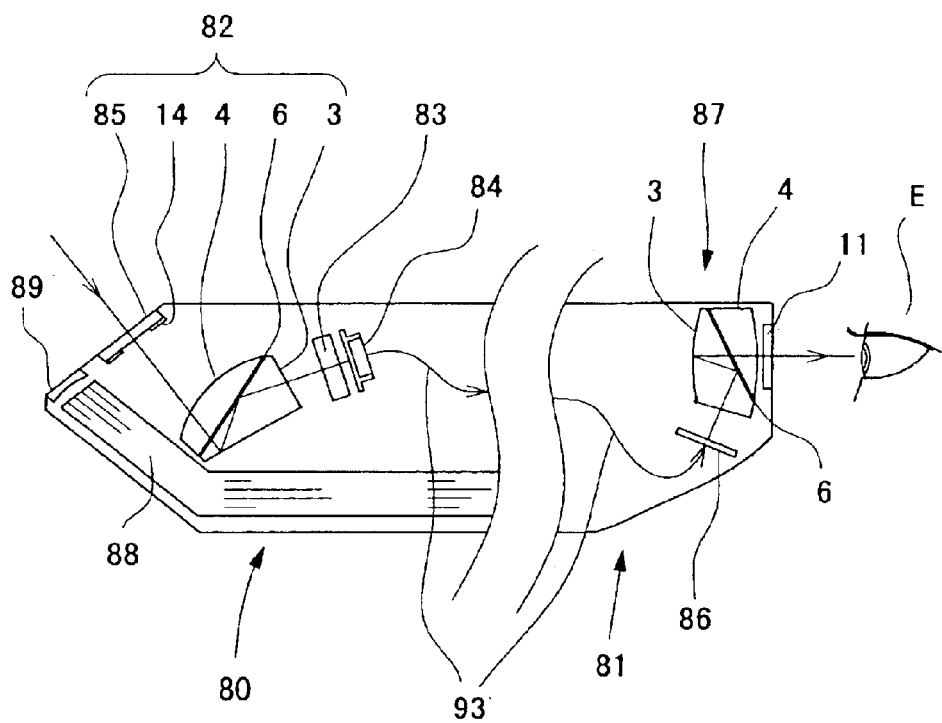

FIG. 15 are schematic views to show a configuration where the photographing optical system of the present invention is incorporated into an objective optical system 82 of an observation system of an electronic endoscope and where the observation optical system of the present invention is incorporated into an eyepiece optical system 87 of the observation system of the electronic endoscope. In this example, the objective optical system 82 and the eyepiece optical system 87 of the observation system employ optical systems which are configured substantially the same as those of the first and second embodiments. As shown in FIG. 15A, the electronic endoscope system includes an electronic endoscope 71, a light source unit 72 which provides illumination light, a video processor 73 which performs signal processing in response to the electronic endoscope 71, a monitor 74 which displays a video signal outputted from the video processor 73, a VTR deck 75 and a video disk 76 which are connected with the video processor 73 and which record the video signal, a video printer 77 which prints out the video signal as an image, and a head-mount type image display apparatus (HMD) 78 as shown, for example, in FIG. 8. In the electronic endoscope 71, a distal end section 80 of an inserting section 79 and an eyepiece section 81 are configured as shown in FIG. 15B.

A beam of rays emanating from the light source unit 72 is made to illuminate a portion under observation by an objective optical system 89 of an illumination system via a light guide fiber bundle 88. Rays reflected back from the portion under observation is formed as an object image by the objective optical system 82 of the observation system via a cover member 85. The object image is formed on an image pickup surface of a CCD 84 via a filter 83 such as a low-pass filter and an infrared cut filter. The CCD 84 converts the object image into a video signal, which is, via the video processor 73 shown in FIG. 15A, directly displayed on the monitor 74 as it is, is recorded in the video deck 75 and the video disk 76, is printed out from the video printer 77 as an image, and is displayed on the image display element 5 (FIG. 9) of the HMD 78 to be provided for an observer who wears the RMD 78. Simultaneously, the video signal converted by the CCD 84 is displayed, as an electronic image, on a liquid crystal display element (LCD) 86 in the eyepiece section 81 via an image signal transmitter 93. The displayed image there is introduced to the eye E of an observer via the eyepiece optical system 87 constructed of the observation optical system of the present invention.

The endoscope thus configured can be constructed of a small number of optical members and facilitates high performance and cost reduction. Also, since the objective optical system 82 is arranged in the longitudinal direction of the endoscope, the above-mentioned effects can be attained without obstructing size reduction in diameter of the endoscope.

Figure 16:
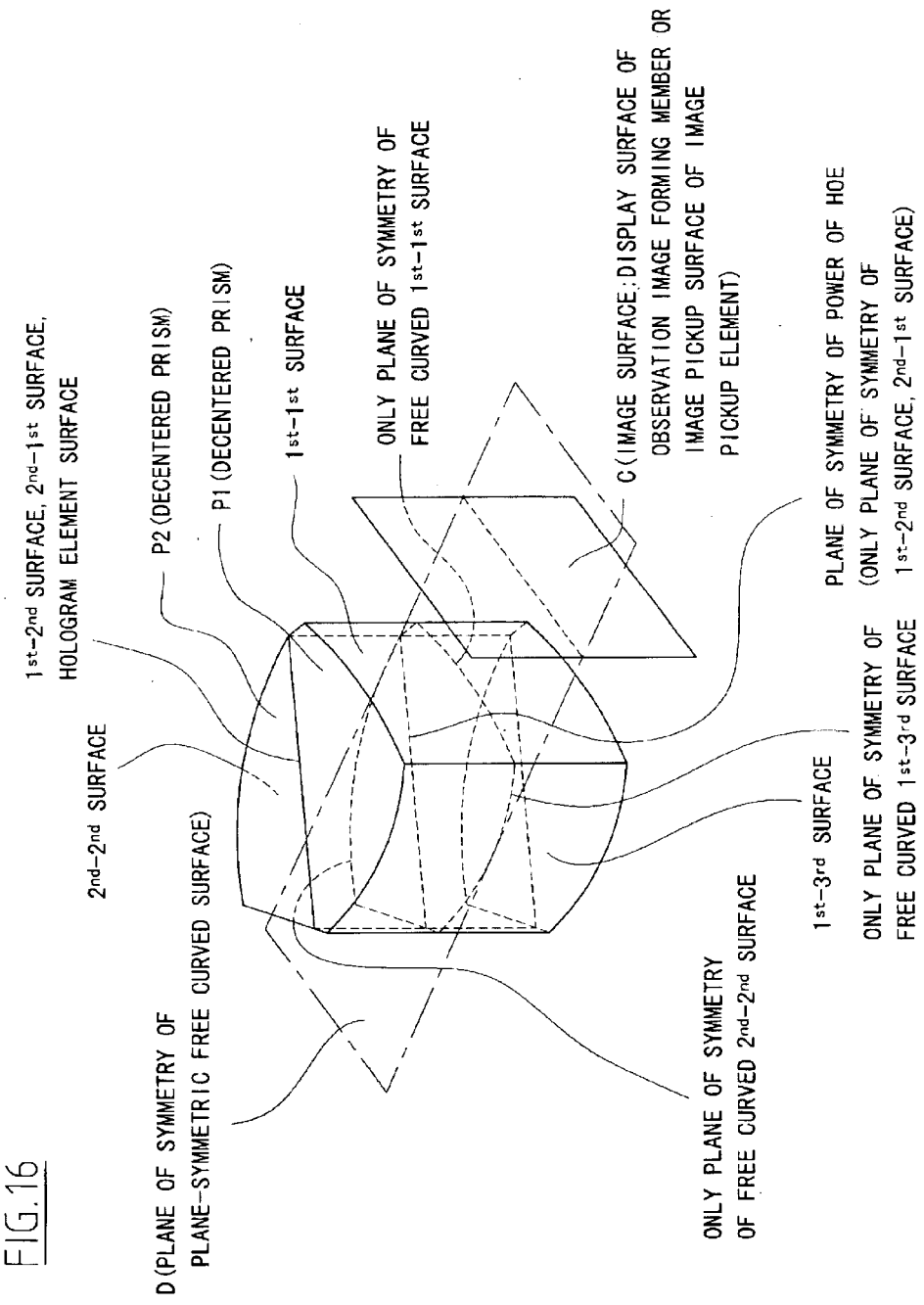
FIG. 16 shows a preferred configuration in the case where a HOE is applied to a prism included in the optical system according to the present invention.
Figure 17A:
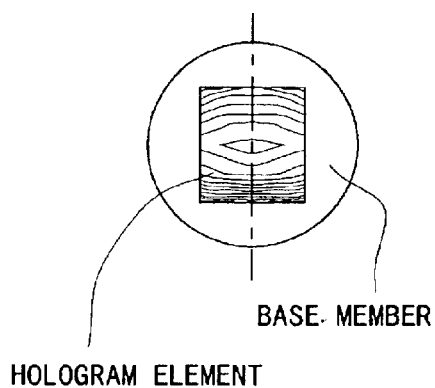
FIG. 17A is a front view and FIG. 17B is a side view.
Figure 17B:
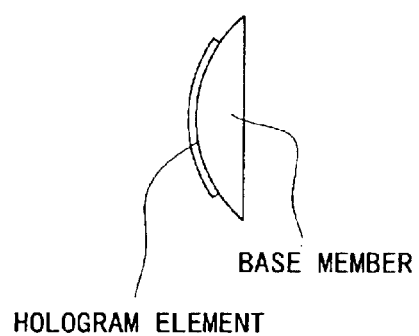
Figure 18:
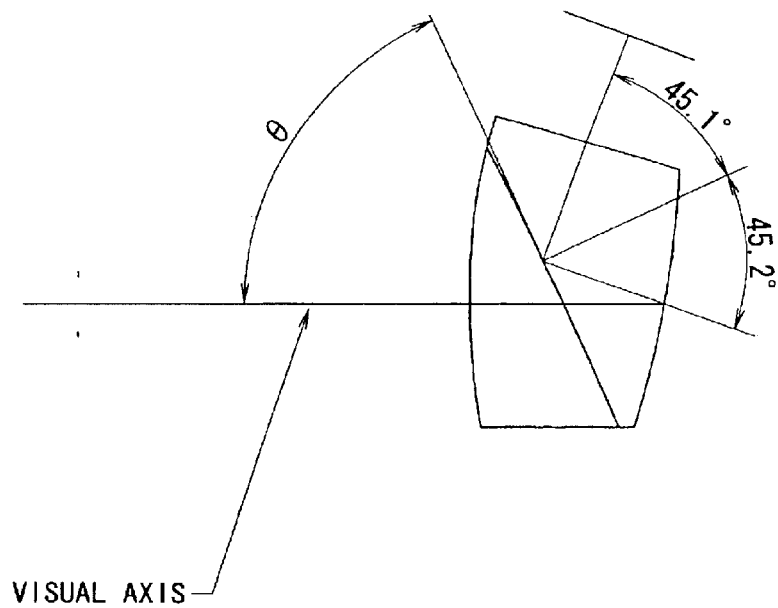
FIG. 18 is an explanatory view to show the angle θ formed between a tangent to the hologram element surface at the intersection with the axial chief ray and the visual axis and to show calculation conditions of diffraction efficiency at the volume hologram surface according to the present invention.
Figure 19:
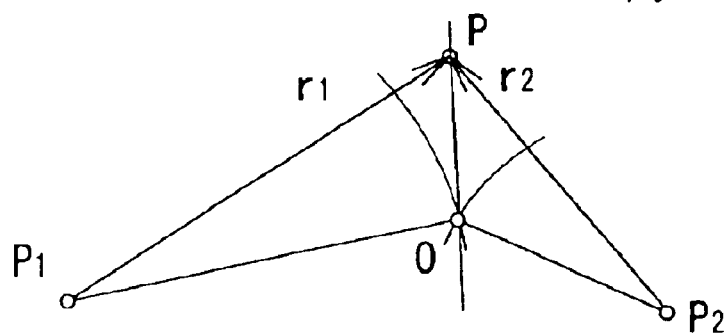
FIG. 19 is a view to show the principle of defining HOE according to the present invention.
Figure 20:
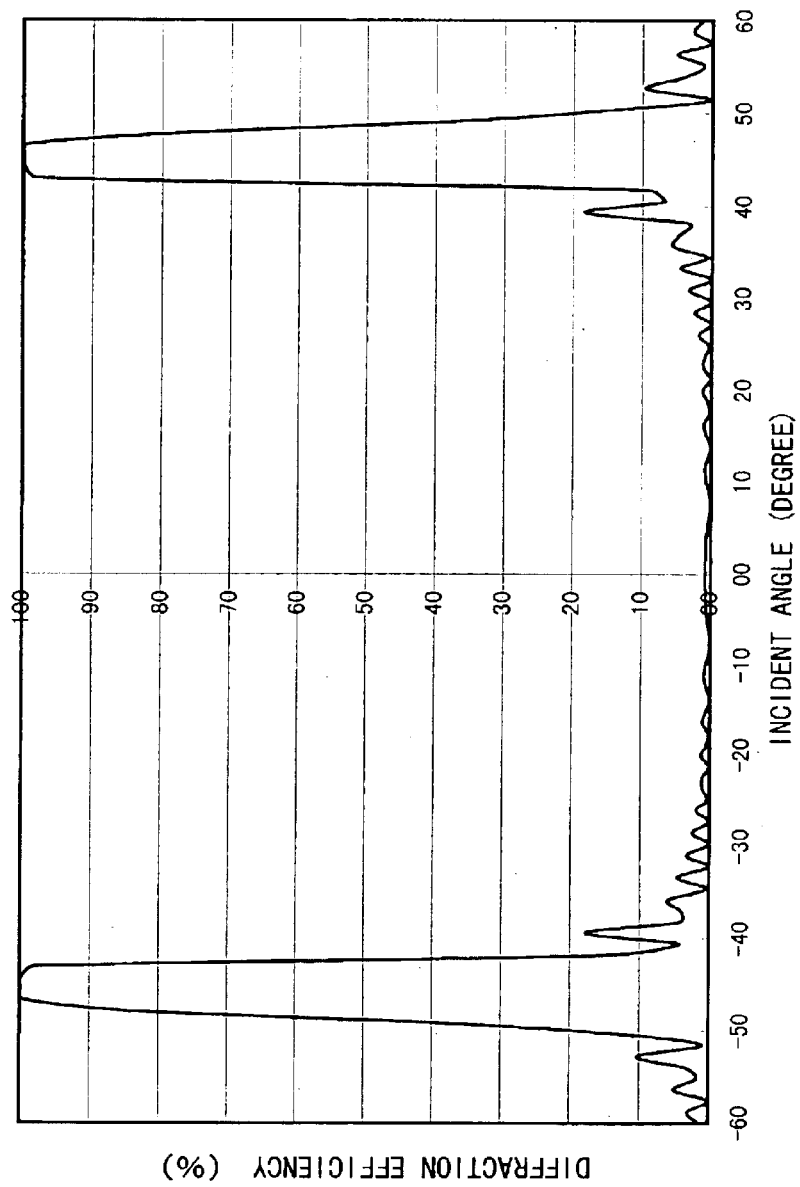
FIG. 20 is a graph in which the diffraction efficiency at the volume hologram surface of the present invention for the axial chief ray with the wavelength of 520 nm is plotted against the incident angle.

Next, a desirable arrangement in combining a diffraction element such as a volume hologram into the prisms that constitute the optical system of the present invention is shown in FIG. 16. In the drawing, the decentered prisms P1, P2 correspond, respectively, to the first prism 3 and the second prism 4 included in the observation optical system or the photographing optical system of the present invention. In the case where the image surface C (e. g. the display surface of the image display element 5, the image pickup surface of the image pickup element) is shaped quadrangular as shown in the drawing and the $1^{st}$-$1^{st}$ surface of the decentered prism P1 (the first entrance surface $3_3$ of the first prism 3) or the $2^{nd}$-$2^{nd}$ surface of the decentered prism P2 (the second exit surface $4_1$ of the second prism 4) is shaped as a plane-symmetric free curved surface, it is desirable, for beautiful image forming, to make arrangement so that the plane of symmetry D is parallel to at least one side of the quadrangular image surface C.

Furthermore, if the image surface C forms a regular square or a rectangle with all of its interior angles being substantially 90°, it is desirable to make arrangement so that the plane of symmetry D of the plane-symmetric free curved surface is parallel to two opposite sides of the image surface C and that the plane of symmetry D coincides with the plane of symmetry of the image surface C. Such an arrangement facilitates assembly accuracy and thus is effective for mass production.

Furthermore, if a plurality or all of optical surfaces constituting the decentered prisms P1, P2 such as the $1^{st}$-$1^{st}$ surface (the first entrance surface $3_3$ of the first prism 3), the $1^{st}$-$2^{nd}$ surface (the first exit surface $3_1$ of the first prism 3), the $1^{st}$-$3^{rd}$ surface (the reflecting surface $3_2$ of the first prism 3), the $2^{nd}$-$1^{st}$ surface (the second entrance surface $4_2$ of the second prism 4) and the $2^{nd}$-$2^{nd}$ surface (the second exit surface $4_1$ of the second prism 4) are plane-symmetric free curved surfaces, it is desirable, in view of design convenience and in aberration performance also, to make arrangement so that the planes of symmetry of the plurality or all of the plane symmetric surfaces are arranged on the common plane D. It is also desirable to satisfy the above-mentioned relationship between the plane of symmetry D and the power surface of the diffraction element 6.

What is claimed is:

1. An observation optical system comprising:
   an observation image forming member which forms an observation image to be observed by an observer; and
   an eyepiece optical member which introduces the observation image formed by said observation image forming member into an exit pupil formed at a position of an eye of the observer,
   wherein said eyepiece optical member comprises, at least, a first prism and a second prism,
   wherein said first prism comprises, at least, a first entrance surface through which rays from the observation image enter said first prism, a reflecting surface which reflects the rays inside said first prism, and a first exit surface through which the rays exit out of said first prism, said first entrance surface, said reflecting surface, and said first exit surface being arranged with a first prism medium between,
   wherein said second prism comprises, at least, a second entrance surface through which the rays emergent from said first prism enter said second prism and a second exit surface through which the rays exit out of said second prism, said second entrance surface and said second exit surface being arranged with a second prism medium between,
   wherein said first prism and said second prism are configured to be joined to one another via a hologram element interposed between said first exit surface and said second entrance surface,
   wherein said reflecting surface of said first prism is shaped as a concave curved surface to give a positive power for rays reflected therefrom,
   wherein said first entrance surface of said first prism is shaped as a curved surface to give a power for rays transmitted therethrough, and
   wherein said second exit surface of said second prism is shaped as a curved surface to give a power for rays transmitted therethrough.

2. An observation optical system according to claim 1, wherein said first prism medium and said second prism medium are made of a same material.

3. An observation optical system according to claim 1, wherein said first exit surface of said first prism and said second entrance surface of said second prism are substantially congruently shaped.

4. An observation optical system according to claim 1, wherein each of said first exit surface of said first prism and said second entrance surface of said second prism is shaped as a curved surface.

5. An observation optical system according to claim 1, wherein each of said first exit surface of said first prism and said second entrance surface of said second prism is shaped as a rotationally symmetric spherical surface.

6. An observation optical system according to claim 1, wherein a ghost light removing member is provided for optically non-operative faces of said first prism and said second prism so as to prevent ghost light from being introduced to the eye of the observer, said optically non-operative faces being defined as faces of said first prism and said second prism other than optically operative faces used to transmit or reflect rays.

7. An observation optical system according to claim 1, wherein said first entrance surface of said first prism is shaped as a rotationally asymmetric curved surface.

8. An observation optical system according to claim 1, wherein said hologram element is constructed and arranged to compensate both of a rotationally symmetric component and a rotationally asymmetric component of chromatic aberration of magnification by reflecting diffraction.

9. An observation optical system according to claim 1, wherein the following condition (1) is satisfied:

$$50 \text{ (degree)} < \theta < 80 \text{ (degree)} \quad (1)$$

where θ is an angle formed between a tangent to a base surface of said hologram element at an intersection with an axial chief ray and a visual axis.

10. An observation optical system according to claim 1, wherein the following condition (2) is satisfied:

$$60 \text{ (degree)} < \theta < 70 \text{ (degree)} \quad (2)$$

where θ is an angle formed between a tangent to a base surface of said hologram element at an intersection with an axial chief ray and a visual axis.

11. An observation optical system according to claim 1, wherein said first entrance surface of said first prism is shaped as a rotationally asymmetric curved surface which is constructed of a free curved surface defining only one plane of symmetry, said only one plane of symmetry coinciding with a plane (Y-Z plane) in which an optical axis is folded.

12. An observation optical system according to claim 1, wherein said second exit surface of said second prism is shaped as a rotationally asymmetric curved surface that has an action of compensating at least one of rotationally asymmetric aberrations including a rotationally asymmetric coma and a rotationally asymmetric astigmatism, which are generated at said eyepiece optical member.

13. An observation optical system according to claim 1, wherein said second exit surface of said second prism is shaped as a rotationally asymmetric curved surface that has an action of compensating at least one of rotationally asymmetric aberrations including a rotationally asymmetric coma and a rotationally asymmetric astigmatism, which are generated at said eyepiece optical member, and said rotationally asymmetric curved surface is constructed of a free curved surface defining only one plane of symmetry, said only one plane of symmetry coinciding with a plane (Y-Z plane) in which an optical axis is folded.

14. A head-mount type image display apparatus comprising:
a main frame in which said observation optical system according to claim 1 is arranged;
a support member which supports said main frame on a head of the observer so as to hold the exit pupil of said observation optical system at the position of the eye of the observer; and
a speaker member which provides a sound for an ear of the observer.

15. A head-mount type image display apparatus comprising:
a main frame in which said observation optical system according to claim 1 is arranged;
a support member which supports said main frame on a head of the observer so as to hold the exit pupil of said observation optical system at the position of the eye of the observer; and
a speaker member which provides a sound for an ear of the observer,
wherein said main frame is provided with an observation optical system for a right eye and an observation optical system for a left eye, and wherein said speaker member comprises a speaker member for a right ear and a speaker member for a left ear.

16. A head-mount type image display apparatus comprising:
a main frame in which said observation optical system according to claim 1 is arranged;
a support member which supports said main frame on a head of the observer so as to hold the exit pupil of said observation optical system at the position of the eye of the observer; and
a speaker member which provides a sound for an ear of the observer,
wherein said speaker member is constructed of a earphone.

17. A photographing optical system comprising:
an image pickup element disposed on an image surface for photographing an image of an object;
an aperture stop disposed on a pupil surface for regulating brightness of a beam of rays from the object; and
an imaging optical member disposed between the image surface and the pupil surface for introducing the image of the object into the image surface,
wherein said imaging optical member comprises, at least, a second prism and a first prism,
wherein said second prism comprises, at least, a third entrance surface through which rays emergent from the object and passing through said aperture stop enter said second prism and a third exit surface through which the rays exit out of said second prism, said third entrance surface and said third exit surface being arranged with a second prism medium between,
wherein said first prism comprises, at least, a fourth entrance surface through which the rays emergent from said second prism enter said first prism, a reflecting surface which reflects the rays inside said first prism, and a fourth exit surface through which the rays exit out of said first prism, said fourth entrance surface, said reflecting surface, and said fourth exit surface being arranged with a first prism medium between,
wherein said second prism and said first prism are configured to be joined to one another via a hologram element interposed between said third exit surface and said fourth entrance surface,
wherein said reflecting surface of said first prism is shaped as a concave curved surface to give a positive power for rays reflected therefrom,
wherein said fourth exit surface of said first prism is shaped as a curved surface to give a power for rays transmitted therethrough, and
wherein said third entrance surface of said second prism is shaped as a curved surface to give a power for rays transmitted therethrough.

18. A photographing optical system according to claim 17, wherein said first prism medium and said second prism medium are made of a same material.

19. A photographing optical system according to claim 17, wherein said fourth entrance surface of said first prism and said third exit surface of said second prism are substantially congruently shaped.

20. A photographing optical system according to claim 17, wherein each of said fourth entrance surface of said first prism and said third exit surface of said second prism is shaped as a curved surface.

21. A photographing optical system according to claim 17, wherein each of said fourth entrance surface of said first prism and said third exit surface of said second prism is shaped as a rotationally symmetric spherical surface.

22. A photographing optical system according to claim 17, wherein a ghost light removing member is provided for optically non-operative faces of said first prism and said second prism so as to prevent ghost light from being introduced to said image pickup element, said optically non-operative faces being defined as faces of said first prism and said second prism other than optically operative faces used to transmit or reflect rays.

23. A photographing optical system according to claim 17, wherein said fourth exit surface of said first prism is shaped as a rotationally asymmetric curved surface.

24. A photographing optical system according to claim 17, wherein said hologram element is constructed and arranged to compensate both of a rotationally symmetric component and a rotationally asymmetric component of chromatic aberration of magnification by reflecting diffraction.

25. A photographing optical system according to claim 17, wherein the following condition (1) is satisfied:

$$50 \text{ (degree)} < \theta < 80 \text{ (degree)} \quad (1)$$

where θ is an angle formed between a tangent to a base surface of said hologram element at an intersection with an axial chief ray and a visual axis.

26. A photographing optical system according to claim 17, wherein the following condition (2) is satisfied:

$$60 \text{ (degree)} < \theta < 70 \text{ (degree)} \quad (2)$$

where θ is an angle formed between a tangent to a base surface of said hologram element at an intersection with an axial chief ray and a visual axis.

27. A photographing optical system according to claim 17, wherein said fourth exit surface of said first prism is shaped as a rotationally asymmetric curved surface which is constructed of a free curved surface defining only one plane of symmetry, said only one plane of symmetry coinciding with a plane (Y-Z plane) in which an optical axis is folded.

28. A photographing optical system according to claim 17, wherein said third entrance surface of said second prism is shaped as a rotationally asymmetric curved surface that has an action of compensating at lest one of rotationally asymmetric aberrations including a rotationally asymmetric coma and a rotationally asymmetric astigmatism, which are generated at said imaging optical member.

29. A photographing optical system according to claim 17, wherein said third entrance surface of said second prism is shaped as a rotationally asymmetric curved surface that has an action of compensating at least one of rotationally asymmetric aberrations including a rotationally asymmetric coma and a rotationally asymmetric astigmatism, which are generated at said imaging optical member, and said rotationally asymmetric curved surface is constructed of a free curved surface defining only one plane of symmetry, said only one plane of symmetry coinciding with a plane (Y-Z plane) in which an optical axis is folded.

30. An apparatus comprising: an observation optical system, said observation optical system comprising:
   an observation image forming member which forms, on an image surface, an observation image to be observed by an observer; and
   an eyepiece optical member disposed between the image surface and an exit pupil formed at a position of an eye of the observer so as to introduce the observation image formed by said observation image forming member into the eye of the observer, wherein said eyepiece optical member comprises, at least, a first prism and a second prism, wherein said first prism comprises, at least, a first entrance surface through which rays from the observation image enter said first prism, a reflecting surface which reflects the rays inside said first prism, and a first exit surface through which the rays exit out of said first prism, said first entrance surface, said reflecting surface, and said first exit surface being arranged with a first prism medium between, wherein said second prism comprises, at least, a second entrance surface through which the rays emergent from said first prism enter said second prism and a second exit surface through which the rays exit out of said second prism, said second entrance surface and said second exit surface being arranged with a second prism medium between, wherein said first prism and said second prism are configured to be joined to one another via a hologram element interposed between said first exit surface and said second entrance surface, wherein said reflecting surface of said first prism is shaped as a concave curved surface to give a positive power for rays reflected therefrom, wherein said first entrance surface of said first prism is shaped as a curved surface to give a power for rays transmitted therethrough, and wherein said second exit surface of said second prism is shaped as a curved surface to give a power for rays transmitted therethrough.

31. An apparatus comprising:

a photographing optical system, said photographing optical system comprising:

an image pickup element disposed on an image surface for photographing an image of an object;

an aperture stop disposed on a pupil surface for regulating brightness of a beam of rays from the object; and an imaging optical member disposed between the image surface and the pupil surface for introducing the image of the object into the image surface, wherein said imaging optical member comprises, at least, a second prism and a first prism, wherein said second prism comprises, at least, a third entrance surface through which rays emergent from the object and passing through said aperture stop enter said second prism and a third exit surface through which the rays exit out of said second prism, said third entrance surface and said third exit surface being arranged with a second prism medium between, wherein said first prism comprises, at least, a fourth entrance surface through which the rays emergent from said second prism enter said first prism, a reflecting surface which reflects the rays inside said first prism, and a fourth exit surface through which the rays exit out of said first prism, said fourth entrance surface, said reflecting surface, and said fourth exit surface being arranged with a first prism medium between, wherein said second prism and said first prism are configured to be joined to one another via a hologram element interposed between said third exit surface and said fourth entrance surface, wherein said reflecting surface of said first prism is shaped as a concave curved surface to give a positive power for rays reflected therefrom, wherein said fourth exit surface of said first prism is shaped as a curved surface to give a power for rays transmitted therethrough, and wherein said third entrance surface of said second prism is shaped as a curved surface to give a power for rays transmitted therethrough.

* * * * *